United States Patent
Takahashi et al.

(10) Patent No.: US 7,031,495 B2
(45) Date of Patent: Apr. 18, 2006

(54) DATA AUTHORING DEVICE

(75) Inventors: Kazuhiko Takahashi, Hachioji (JP);
Akito Saito, Hino (JP); Takao Shibasaki, Tokyo (JP); Takemasa Sugita, Chofu (JP); Takeo Asano, Kunitachi (JP); Mikihiko Terashima, Hachioji (JP); Yuichiro Akatsuka, Tama (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/231,582

(22) Filed: Sep. 21, 2005

(65) Prior Publication Data

US 2006/0013436 A1    Jan. 19, 2006

Related U.S. Application Data

(63) Continuation of application No. PCT/JP2004/004336, filed on Mar. 26, 2004.

(30) Foreign Application Priority Data

| Mar. 28, 2003 | (JP) | ............................. 2003-090060 |
| Oct. 10, 2003 | (JP) | ............................. 2003-352341 |
| Nov. 28, 2003 | (JP) | ............................. 2003-400877 |

(51) Int. Cl.
*G06K 9/00*    (2006.01)

(52) U.S. Cl. ..................................... 382/100; 715/731

(58) Field of Classification Search ................ 382/100, 382/152, 189, 194, 214; 345/156, 158, 399, 345/473, 530, 598, 619, 659, 689; 715/716, 715/731, 526, 761, 867
See application file for complete search history.

(56) References Cited

U.S. PATENT DOCUMENTS

| 5,483,604 A | * | 1/1996 | Salisbury ..................... 382/152 |
| 6,061,644 A | * | 5/2000 | Leis ........................... 702/153 |
| 6,956,573 B1 | * | 10/2005 | Bergen et al. ................. 345/473 |

FOREIGN PATENT DOCUMENTS

JP    11-88913    3/1999

(Continued)

OTHER PUBLICATIONS

Translation of International Preliminary Examination Report dated May 18, 2004.

*Primary Examiner*—Jingge Wu
*Assistant Examiner*—Abolfazl Tabatabai
(74) *Attorney, Agent, or Firm*—Scully, Scott, Murphy & Presser, P.C.

(57) ABSTRACT

A data authoring device sets predetermined relevant information for an information presenting apparatus which outputs the predetermined relevant information by use of spatial orientation information meant by an object of the real world and/or a previously decided marker with respect to the object and/or the marker. A spatial orientation information input section inputs the spatial orientation information of the object and/or the previously decided marker. A relevant information setting section sets a method of displaying the predetermined relevant information. A spatial orientation information display section displays the spatial orientation information of the object and/or the previously decided marker input, and displays the predetermined relevant information in accordance with the displaying method. A data output section outputs data describing display setting of the display by the spatial orientation information display section.

20 Claims, 18 Drawing Sheets

FOREIGN PATENT DOCUMENTS

| | | |
|---|---|---|
| JP | 11-232488 | 8/1999 |
| JP | 2000-202164 | 7/2000 |
| JP | 2000-350860 | 12/2000 |
| JP | 2001-209826 | 8/2001 |
| JP | 2002-163670 | 6/2002 |

* cited by examiner

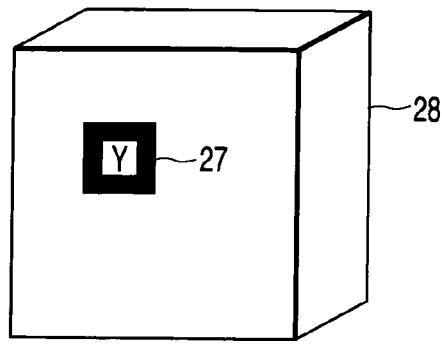
F I G. 18 A
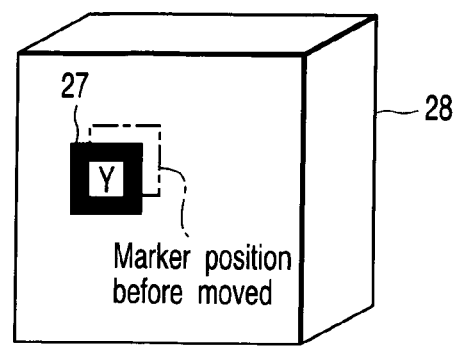
F I G. 18 D
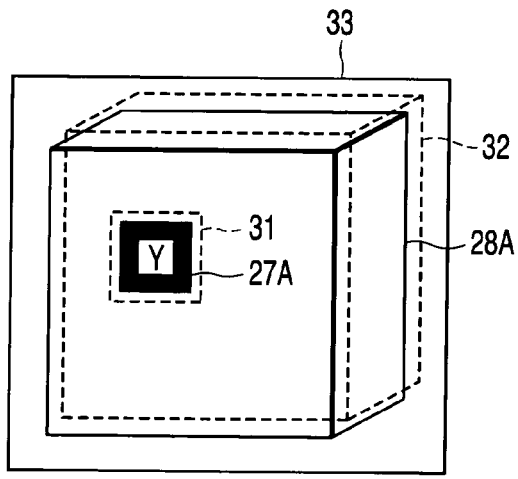
F I G. 18 B
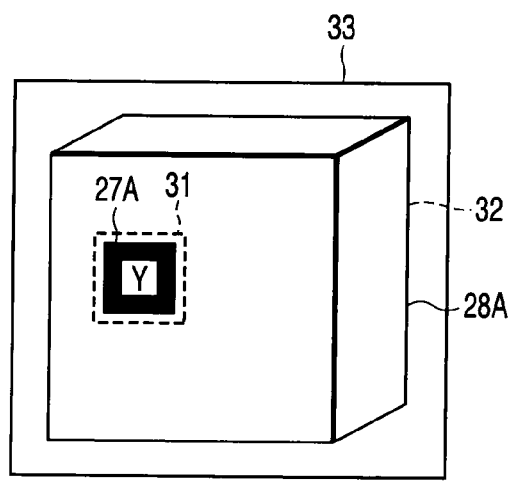
F I G. 18 E
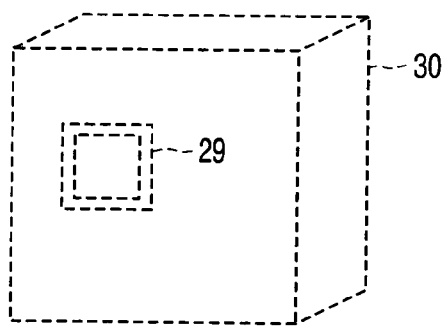
F I G. 18 C
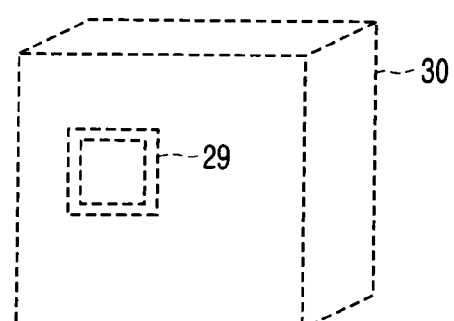
F I G. 18 F

DATA AUTHORING DEVICE

CROSS-REFERENCE TO RELATED APPLICATIONS

This is a Continuation Application of PCT Application No. PCT/JP2004/004336, filed Mar. 26, 2004, which was published under PCT Article 21(2) in Japanese.

This application is based upon and claims the benefit of priority from prior Japanese Patent Applications No. 2003-090060, filed Mar. 28, 2003; No. 2003-352341, filed Oct. 10, 2003; and No. 2003-400877, filed Nov. 28, 2003, the entire contents of all of which are incorporated herein by reference.

BACKGROUND OF THE INVENTION

1. Field of the Invention

The present invention relates to a data authoring device which sets predetermined relevant information for an information presenting apparatus to output the predetermined relevant information in association with spatial orientation information with respect to an object in the real world and/or a previously decided marker.

2. Description of the Related Art

As information presenting apparatuses which output predetermined relevant information with respect to an object in the real world and/or a previously decided marker, apparatuses utilizing a two-dimensional code have been known very well. Of these apparatuses, there is an apparatus which outputs relevant information by use of spatial orientation information of the object and/or the previously decided marker. In this apparatus, as shown in FIG. 30, a two-dimensional code 601 is read by a camera (not shown) as a marker printed on a name card 600 which is the object, and a two-dimensionally coded ID is analyzed by a program in a computer not shown. Next, there is proposed an apparatus in which a face photograph 602 of a person corresponding to this ID is read from an image file specified by the ID, and displayed in a display 700 of the computer next to the two-dimensional code 601 on the name card 600. An example of such an apparatus is disclosed in, for example, Jpn. Pat. Appln. KOKAI Publication No. 2000-82107.

In a case where the face photograph 602 is displayed beside the two-dimensional code 601 on the name card 600 as in the apparatus disclosed in Jpn. Pat. Appln. KOKAI Publication No. 2000-82107, the face photograph may be displayed in a coordinates region which has moved in parallel from a position coordinates of the two-dimensional code 601 to a neighboring region on the same plane, and therefore an output coordinates can be easily calculated and set.

BRIEF SUMMARY OF THE INVENTION

According to a first aspect of the present invention, there is provided a data authoring device which sets predetermined relevant information for an information presenting apparatus to output the predetermined relevant information by use of spatial orientation information meant by an object of the real world and/or a previously decided marker, the device comprising:

a spatial orientation information input section which inputs the spatial orientation information of the object and/or the previously decided marker;

a relevant information setting section which sets a method of displaying the predetermined relevant information;

a spatial orientation information display section which displays the spatial orientation information of the object and/or the previously decided marker input by the spatial orientation information input section and which displays the predetermined relevant information in accordance with the displaying method set by the relevant information setting section; and a data output section which outputs data describing display setting of the display by the spatial orientation information display section.

According to a second aspect of the present invention, there is provided a data authoring device according to the first aspect, wherein the predetermined relevant information includes preferably an image information object, and the spatial orientation information display section displays the spatial orientation information of the image information object.

According to a third aspect of the present invention, there is provided a data authoring device according to the first or second aspect, wherein the spatial orientation information display section displays preferably both of the spatial orientation information of the object and that of the previously decided marker, the device further comprising a geometric characteristic setting section which arbitrarily sets geometric characteristics of at least one of the spatial orientation information of the object and that of the previously decided marker.

According to a fourth aspect of the present invention, there is provided a data authoring device according to the second aspect, wherein the spatial orientation information display section displays preferably both of the spatial orientation information of the previously decided marker and that of the image information object, the device further comprising a geometric characteristic setting section which arbitrarily sets geometric characteristics of at least one of the spatial orientation information of the previously decided marker and that of the image information object.

According to a fifth aspect of the present invention, there is provided a data authoring device according to the second aspect, wherein the spatial orientation information display section preferably displays the spatial orientation information of the object, that of the previously decided marker, and that of the image information object, the device further comprising a geometric characteristic setting section which arbitrarily sets geometric characteristics of at least one of the spatial orientation information of the object, that of the previously decided marker, and that of the image information object.

According to a sixth aspect of the present invention, there is provided a data authoring device according to any one of the third to fifth aspects, wherein the geometric characteristics preferably have at least one of a spatial size, rotation, and a shape.

According to a seventh aspect of the present invention, there is provided a data authoring device according to any one of the third to fifth aspects, wherein the geometric characteristic setting section preferably has an optimizing section which appropriately sets the geometric characteristics.

According to an eighth aspect of the present invention, there is provide a data authoring device according to the seventh aspect, wherein the optimizing section preferably has a function of automatically disposing the marker and the object in such a manner that at least the surface of the marker spatially comes into contact with that of the object.

According to a ninth aspect of the present invention, there is provided a data authoring device according to the seventh aspect, wherein the optimizing section preferably automatically sets a spatial region of the marker based on at least one of characteristics and use environment of the information presenting apparatus and the spatial orientation information of the image information object.

According to a tenth aspect of the present invention, there is provided a data authoring device according to the seventh aspect, wherein the optimizing section preferably automatically sets a spatial region to set the image information object based on at least one of characteristics and use environment of the information presenting apparatus and the spatial orientation information of the marker.

According to an eleventh aspect of the present invention, there is provided a data authoring device according to the seventh aspect, wherein the optimizing section preferably sets positions of the marker and the image information object with respect to the object while keeping relative positions of them to be constant.

According to a twelfth aspect of the present invention, there is provided a data authoring device according to any one of the first to eleventh aspects, preferably further comprising a demonstration output section which demonstrates beforehand the information presented by the information presenting apparatus.

According to a thirteenth aspect of the present invention, there is provided a data authoring device according to the second aspect, preferably further comprising an image information characteristic setting section which arbitrarily sets image information characteristics of the image information object or the previously decided marker.

According to a fourteenth aspect of the present invention, there is provided a data authoring device according to the thirteenth aspect, wherein the image information characteristics include preferably at least one of a color, a brightness, an image size, chromatic monochromatic information, a format type, and a letter font of the image.

According to a fifteenth aspect of the present invention, there is provided a data authoring device according to the second aspect, wherein the image information object utilizes preferably a three-dimensional coordinates.

According to a sixteenth aspect of the present invention, there is provided a data authoring device according to the second aspect, wherein the image information object has preferably letter information.

According to a seventeenth aspect of the present invention, there is provided a data authoring device according to the first aspect, which sets preferably at least two of the predetermined relevant information with respect to the same object of the real world and/or the same previously decided marker.

According to an eighteenth aspect of the present invention, there is provided a data authoring device according to the seventeenth aspect, wherein the at least two existing predetermined relevant information preferably are the same type of outputs having different data capacities.

According to a nineteenth invention, there is provided a data authoring device according to the first aspect, preferably further comprising an output attribute information setting section which sets output attribute information related to the relevant information with respect to the predetermined relevant information.

According to a twentieth aspect of the present invention, there is provided a data authoring device according to the nineteenth aspect, wherein the output attribute information comprises preferably at least one of a timing to output the information, a magnitude of voice to be output, a brightness of an image to be output, a resolution of the image to be output, a data amount of the image to be output, and information defined by characteristics or use environments of the information presenting apparatus.

It is to be noted that an object of the real world described in the present invention is assumed to be an object which already exists in the real world, for example, a building structure such as a building or a house, a natural object such as a tree, a traffic signal, piping, and an artificial object such as a piece of furniture. A marker is assumed to indicate various types of codes, numerals, or letters which are artificially set for outputs of the information presenting apparatus, framed symbols and the like. When the object of the real world is registered as the marker for the output of the information presenting apparatus, the object is treated as the marker.

BRIEF DESCRIPTION OF THE SEVERAL VIEWS OF THE DRAWING

FIG. 18A is a diagram showing an object before the completion of the registration operation in a case where the marker is later pasted;

FIG. 18B is a diagram showing a display state before the completion of the registration operation in the case where the marker is later pasted;

FIG. 18C is a diagram showing shape information of the object before the completion of the registration operation in the case where the marker is later pasted;

FIG. 18D is a diagram showing an object after the completion of the registration operation in the case where the marker is later pasted;

FIG. 18E is a diagram showing a display state after the completion of the registration operation in the case where the marker is later pasted;

FIG. 18F is a diagram showing shape information of the object after the completion of the registration operation in the case where the marker is later pasted;

DETAILED DESCRIPTION OF THE INVENTION

A best mode for carrying out the present invention will be described hereinafter in detail with reference to the drawings.

First Embodiment

First, a data authoring device will be described according to a first embodiment of the present invention.

Figure 1:
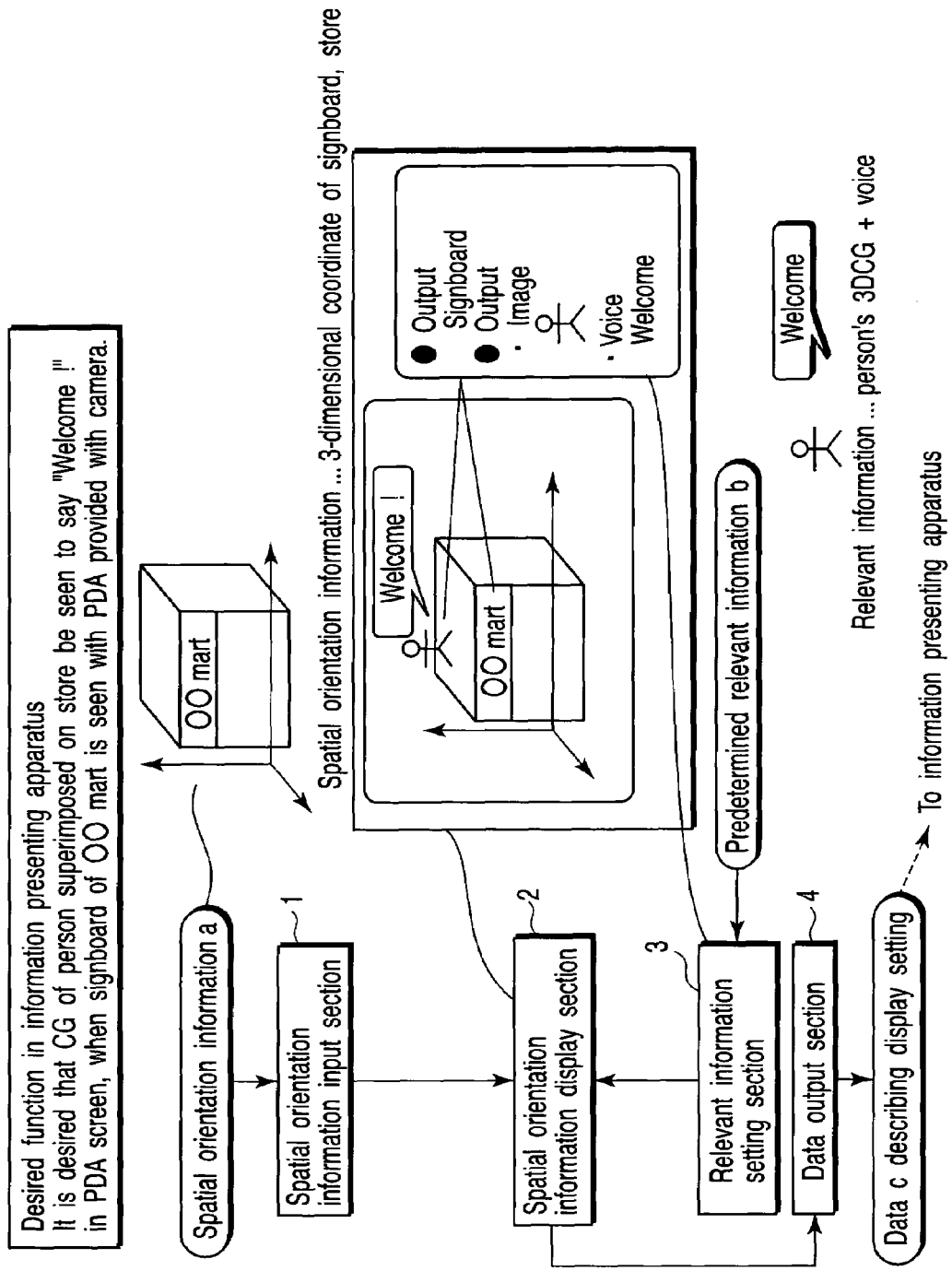
FIG. 1 is an explanatory view of a constitution and an operation of a data authoring device according to a first embodiment of the present invention.

As shown in FIG. 1, the data authoring device according to the present embodiment comprises: a spatial orientation information input section 1; a spatial orientation information display section 2; a relevant information setting section 3; and a data output section 4. Here, the spatial orientation information input section 1 inputs spatial orientation information a of an object of the real world and a previously decided marker, and the spatial orientation information display section 2 displays the spatial orientation information input by the spatial orientation information input section 1. The relevant information setting section 3 sets predetermined relevant information b, and the display of the spatial orientation information display section 2 is edited and updated in accordance with the set predetermined relevant information b. Moreover, the data output section 4 receives display setting edited, updated, and displayed by the spatial orientation information display section 2 from the spatial orientation information display section 2, and outputs data c describing the display setting to an information presenting apparatus (not shown).

An operation of the data authoring device constituted in this manner will be described hereinafter according to the present embodiment. It is to be noted that the information presenting apparatus of an object for which such data authoring device is utilized is assumed as a PDA provided with a camera, the PDA provided with the camera has a camera capable of inputting an image, and a live image input with the camera, and information (image, letter, etc.) prepared by internal processing can be output to a screen. Here, it is assumed that a desired function of this information presenting apparatus is, for example, "it is desired that a person be seen to stand on a store saying "Welcome!" in a PDA screen, when a signboard of ○○ mart is seen with the PDA provided with the camera." The present embodiment is the data authoring device which prepares data for this function. It is to be noted that the signboard already exists in the real world, but is registered as a marker for the output of the information presenting apparatus.

First, by an operator's operation of the data authoring device according to the present embodiment, the spatial orientation information input section 1 inputs the spatial orientation information a of the object of the real world and the previously decided marker. Here, the spatial orientation information a of the object corresponds to three-dimensional coordinates data of the ○○ mart, and the spatial orientation information a of the previously decided marker corresponds to coordinates data of the signboard. It is to be noted that this spatial orientation information input section 1 can comprise, for example, a memory reading unit of a computer. Here, a data file is referred to and read from an external memory.

Subsequently, the spatial orientation information a input by the spatial orientation information input section 1 is displayed in the spatial orientation information display section 2, and the operator of the data authoring device sets the predetermined relevant information b in the relevant information setting section 3 while confirming the displayed spatial orientation information. In the present embodiment, since the predetermined information is to be set in such a manner as to be output when the signboard is seen, the signboard is set as the marker. Moreover, the predetermined relevant information b includes a person's 3DCG data and voice data "welcome", and is set in such a manner that when the person's 3DCG data is disposed on the store, and an image of the signboard is input into the information presenting apparatus, a person appears in a picked-up image displayed in a screen of the information presenting apparatus, and voice saying "welcome" is generated.

Figure 2:
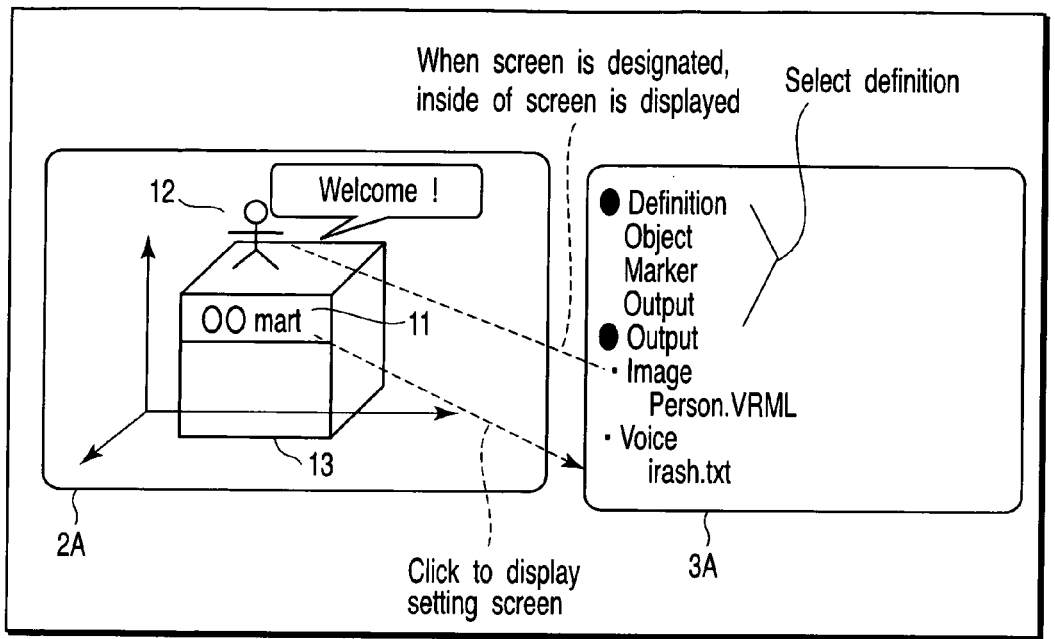
FIG. 2 is a diagram showing a display example in the first embodiment.

In a specific setting method, when a relevant information setting screen 3A shown in FIG. 2 is prepared as the relevant information setting section 3, and a signboard 11 is selected from a spatial orientation information display screen 2A displayed in a display screen 10 by the spatial orientation information display section 2, this relevant information setting screen 3A is displayed, and various types of settings can be performed. Here, since the selected object (signboard 11) is utilized as the marker, the object is defined and registered as the marker. Since the 3DCG data and the voice data are output, this effect is set in this relevant information setting screen 3A. When the 3DCG data is set in this manner, the data is displayed in the spatial orientation information display screen 2A by the spatial orientation information display section 2. That is, in the present embodiment, since a 3DCG 12 of the person is to be output on a store 13, the spatial orientation information display section 2 spatially disposes the 3DCG 12 of the person on the store 13 in the spatial orientation information display screen 2A. It is to be noted that the spatial orientation information display section 2 may display it in the spatial orientation information display screen 2A by use of a perspective view or a three-surface view (front surface, side surface, upper surface) in such a manner that a three-dimensional positional relation is easily seen.

Subsequently, the data c describing the display setting is output from the data output section 4. The data c describing the display setting includes a marker (here, the signboard) coordinates, a marker (here, the signboard) image, output image (here, operator's 3DCG) data, position and posture of an output image, and output voice data. It is to be noted that as to large-capacity data such as CG image contents, a storage address may be described without describing the data itself. In the present embodiment, all data are described in an electronic file, and this electronic file is read by the PDA provided with the camera which is a utilization object. To read the file, the PDA is connected to the data authoring device, and the data may be transmitted from the data authoring device. As a final result, this PDA provided with the camera is brought to an actual site, and it is represented that when the signboard of ○○ mart is seen, the CG character is superimposed and displayed on the store in the PDA screen, and "welcome!" is uttered.

Thus, in the data authoring device according to the present embodiment, when the predetermined relevant information b is set, the spatial orientation information a of the marker (here, the signboard) or the object (here, the store) is displayed in the spatial orientation information display section 2. The operator can set the predetermined relevant information b (here, the 3DCG and voice) in the relevant information setting section 3 while confirming the spatial orientation information a. Therefore, the spatial orientation information for use is not limited to a two-dimensional plane (in this example, when the signboard is seen, the person appears in such a manner as to stand on the store), and an arbitrary output can be easily set. Since various spatial orientation information and the relevant information b can be visually confirmed simultaneously, simulation in the information presenting apparatus can be simultaneously performed. For example, the person's 3DCG can be set in a desired position and direction in such a manner as to achieve higher directing effects. Therefore, there is an effect that an adjustment can be made to obtain a desired output for the operator.

It is to be noted that processors for exclusive use may be used in the respective sections of the data authoring device according to the present embodiment, and all of operating portions constituting the respective sections, or a CPU which has read a program may perform calculation. The spatial orientation information a of the object and the marker need not be minutely measured or prepared three-dimensional data, and may be coarse data in which only characteristic positions are clarified. Texture data may be either present or absent.

Moreover, in the present embodiment, there has been described a case where the relevant information b includes the image data and the voice data, but the information may be the image data only or the voice data only. The spatial orientation information display section 2 and the relevant information setting section 3 may be displayed in separate screens (windows) as in FIG. 2, or either may be included in the same window. The object, definition of the relevant information, definition of the marker or the like may be selected from a sub-window, or a file name may be input and selected. Any method may be used as long as it is means capable of setting the spatial orientation information such as the marker, the object, and the relevant information while displaying the information.

When the information presenting apparatus has input means capable of inputting the image, and can output to the screen a live image input by input means, and information (image, letter, etc.) prepared by internal processing, the apparatus can be variously applied to the PDA provided with the camera, a cellular phone provided with the camera, a PC provided with the camera, a tablet PC provided with the camera, an exclusive-use apparatus specialized in the above-described function and the like.

Furthermore, the data authoring device according to the present embodiment may be a device separated from the information presenting apparatus, or may be incorporated in the information presenting apparatus.

It is to be noted that the predetermined relevant information displayed in the spatial orientation information display section is displayed in accordance with a display method set by the relevant information setting section, but the information does not have to be the same as that actually displayed in the information presenting apparatus. Information displayed at shifted timings may be simultaneously displayed, information may be displayed in such a manner that only a display position is clearly seen, or an image may be simplified and displayed.

These actual constitutions may be considered similarly in all of the embodiments described hereinafter.

Second Embodiment

Next, a second embodiment of the present invention will be described.

Figure 3:
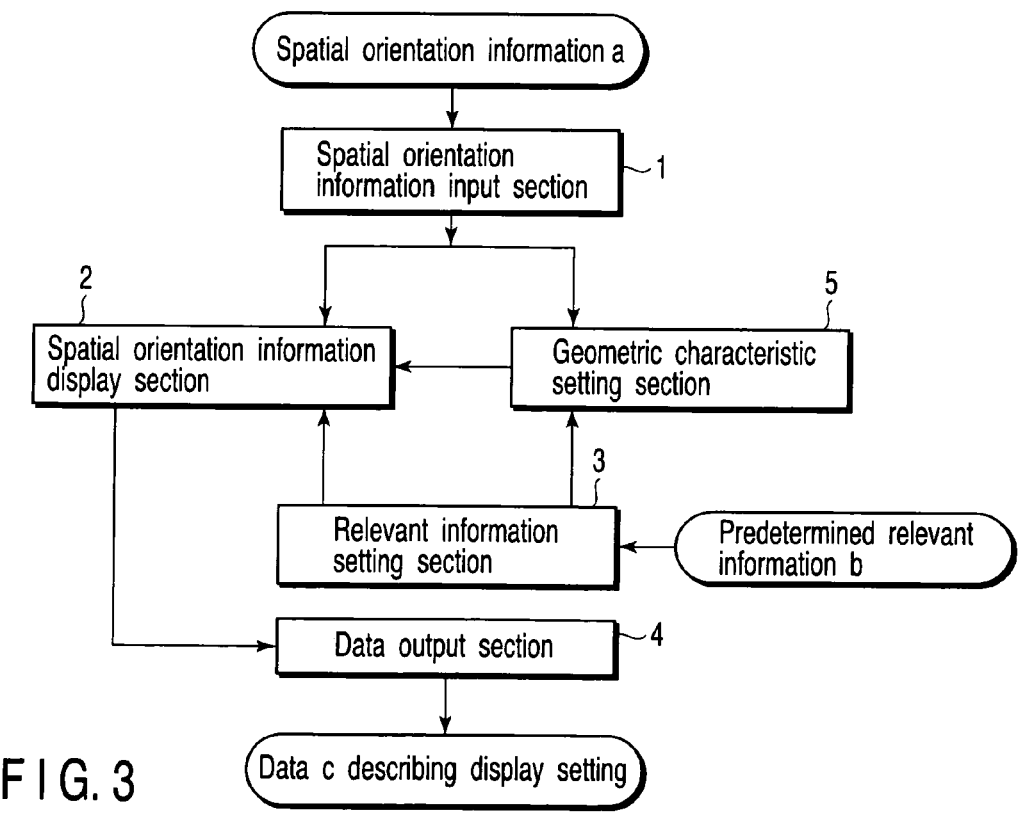
FIG. 3 is a diagram showing a constitution of the data authoring device according to a second embodiment of the present invention.
Figure 4A:
FIG. 4A is a diagram showing an example (No. 1) of a defined marker.
Figure 4B:
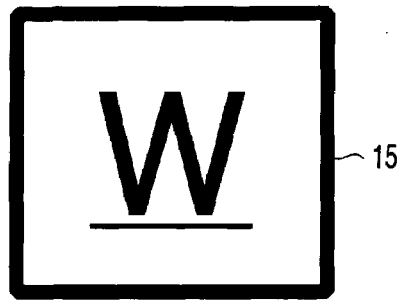
FIG. 4B is a diagram showing an example (No. 2) of the defined marker.

As shown in FIG. 3, a data authoring device according to the present embodiment further comprises a geometric characteristic setting section 5 in addition to the constitution of the data authoring device according to the first embodiment. This geometric characteristic setting section 5 arbitrarily sets geometric characteristics of at least one of an object and a defined marker. It is to be noted that examples of the previously decided marker include a barcode 14 (FIG. 4A) which distinguishes types of articles, a square marker 15 (FIG. 4B) which makes it possible to obtain position/direction of a viewing camera by calculation and the like.

An operation of the data authoring device according to the present embodiment constituted in this manner will be described hereinafter. It is to be noted that in the present embodiment, a PDA provided with a camera is assumed as an information presenting apparatus in the same manner as in the first embodiment, and a desired function is assumed to be a function of artificially pasting a marker to a store and displaying in a PDA screen a person CG as if it stood in front of the store, when the marker is seen. In this case, in the information presenting apparatus, it is necessary to calculate a position or a direction of the camera disposed in the PDA from shape information (distortion, size) of the marker seen in the screen, set a three-dimensional space, and allow the person CG to stand in a position in front of the store in the three-dimensional space. The present embodiment is the data authoring device for the information presenting apparatus (PDA provided with the camera) which satisfies the above-described function.

According to the present embodiment, a spatial orientation information display section 2 of the data authoring device displays in a display screen both of spatial orientation information a of the object, and spatial orientation information a of the above-described previously decided marker. Moreover, an operator of this data authoring device arbitrarily sets the geometric characteristics of at least one of the object and the marker by the geometric characteristic setting section 5.

Figure 5:
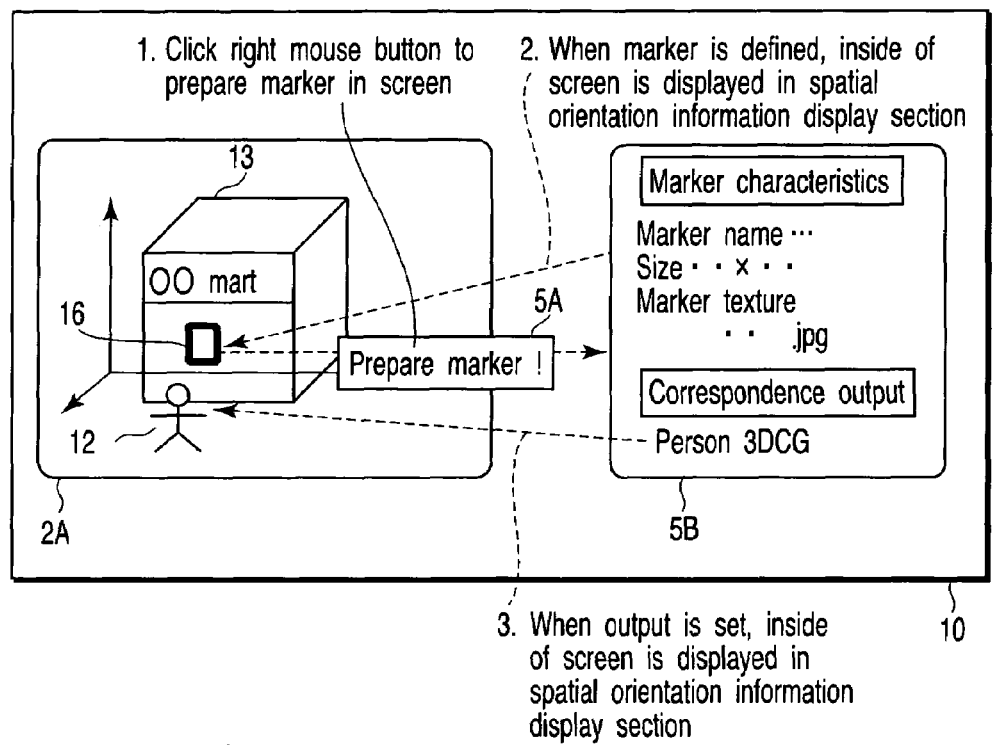
FIG. 5 is a diagram showing a display example in the second embodiment.

This will be described more specifically. When a display screen 10 on a PC is assumed as shown in FIG. 5, and a mouse right button is clicked in the vicinity of a portion where the marker is to be pasted in a store 13 in a spatial orientation information display screen 2A, a dialog 5A for marker preparation appears. Furthermore, when the mouse right button is clicked in the dialog 5A to designate the marker preparation, a marker 16 is displayed in the spatial orientation information display screen 2A. Moreover, in the display screen 10, there is displayed a screen (a geometric characteristic setting screen (for the marker) also serving as a relevant information setting screen 5B) which sets the geometric characteristics of the marker (corresponding to the geometric characteristic setting section 5). In this geometric characteristic setting screen (for the marker) also serving as the relevant information setting screen 5B, a size of the marker, texture information to be displayed in the marker and the like are set. When the geometric characteristics of the marker are set in this manner, the geometric characteristics of the marker 16 displayed in the spatial orientation information display screen 2A also change. After the marker is displayed in the spatial orientation information display screen 2A, the position of the marker can be changed to an arbitrary place, and can be set to a more desired position.

After setting the marker, a person's 3DCG is designated as an output in the above-described geometric characteristic setting screen (for the marker) also serving as the relevant information setting screen 5B, and a person's 3DCG 12 is displayed in the spatial orientation information display screen 2A. The position of the 3DCG 12 may be later set to an appropriate position (here, in front of the store 13).

Finally, the above-described information is output via a data output section 4, and read by the information presenting apparatus, so that a desired function can be realized.

In the present embodiment, the spatial orientation information display section 2 displays both of the spatial orientation information a of the spatial orientation information a of the marker. It is considered that the marker printed on, for example, paper or plastic is pasted on the object, but in actuality, with regard to where to paste the marker, an excessively conspicuous place is visually unfavorable. However, when an image cannot be input, there is no point in using the information presenting apparatus. Therefore, when both of the information are set while being displayed in the spatial orientation information display section 2 as in the present embodiment, it is possible to easily set the information more appropriately. The present embodiment has the geometric characteristic setting section 5 which arbitrarily sets the geometric characteristics of the spatial orientation information a of the object and the spatial orientation information a of the marker. Since the geometric characteristic setting section 5 can set the size, the shape or the like of the marker, it is possible to set the marker according to the appropriate conditions (e.g., conditions that the marker is easily recognized by an end user who uses the information presenting apparatus without impairing scenery).

Third Embodiment

Figure 6:
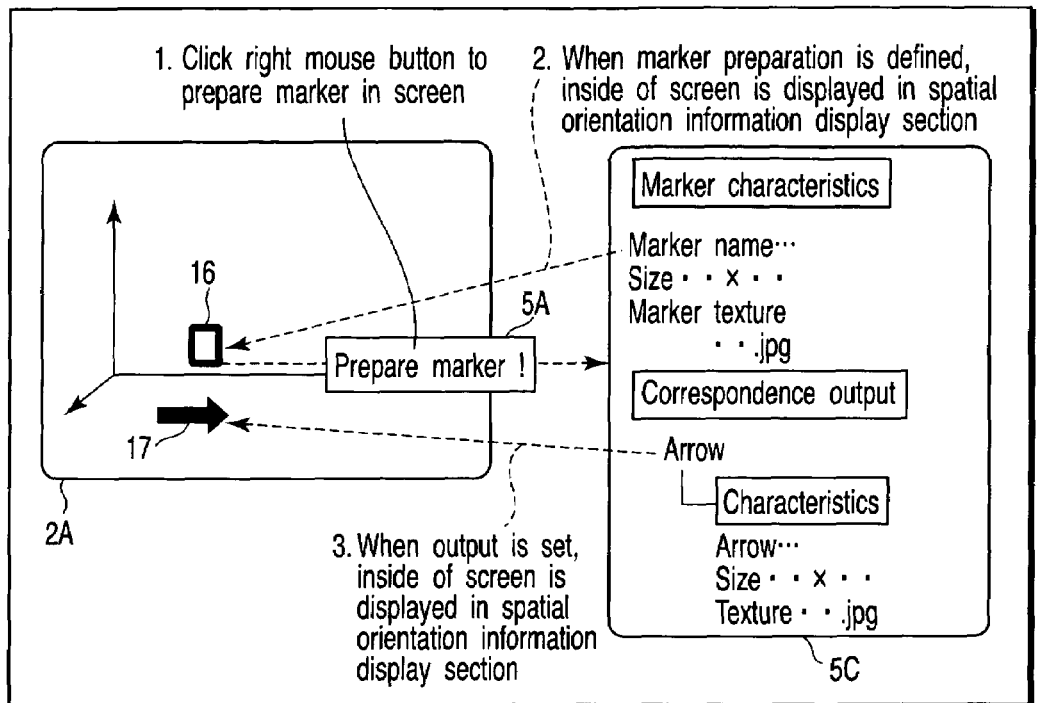
FIG. 6 is a diagram showing a display example in the data authoring device according to a third embodiment of the present invention.

Next, a data authoring device will be described with reference to FIG. 6 according to a third embodiment of the present invention. It is to be noted that in the present embodiment, a PDA provided with a camera is assumed as an information presenting apparatus in the same manner as in the first embodiment, and a desired function is assumed to be a function of artificially installing a marker on a street corner and displaying in a screen an arrow to an arbitrary place in front of the marker, when the marker is seen. In the information presenting apparatus, it is necessary to calculate a position or a direction of the camera disposed in the PDA from shape information (distortion, size) of the marker seen in the screen, set a three-dimensional space, and install the arrow in front of the marker in the three-dimensional space. The present embodiment is the data authoring device for the information presenting apparatus (PDA provided with the camera) which satisfies the above-described function.

According to the present embodiment, a spatial orientation information display section 2 of the data authoring device displays in a screen both of spatial orientation information a of a previously decided marker, and spatial orientation information a of an image information object (here corresponding to the arrow). Moreover, there is disposed a geometric characteristic setting section 5 which arbitrarily sets geometric characteristics of the spatial orientation information of the previously decided marker and the image information object.

This will be described more specifically. When a display screen 10 on a PC is assumed as shown in FIG. 6, and a mouse right button is clicked in an arbitrary position in a spatial orientation information display screen 2A, a dialog 5A for marker preparation appears. When the marker preparation is designated, a marker 16 is displayed in the spatial orientation information display screen 2A. Moreover, in the display screen 10, there is displayed a screen (a geometric characteristic setting screen (for the marker, arrow) also serving as a relevant information setting screen 5C) which sets the geometric characteristics of the marker (corresponding to the geometric characteristic setting section 5). In this geometric characteristic setting screen (for the marker, arrow) also serving as the relevant information setting screen 5C, a size of the marker, texture information to be displayed in the marker and the like are set. When the geometric characteristics of the marker are set, the geometric characteristics of the marker 16 displayed in the spatial orientation information display screen 2A also change. After the marker is displayed in the spatial orientation information display screen 2A, the position of the marker 16 can be changed to an arbitrary place, and can be set to a more desired position.

After setting the marker, an arrow is designated as an output in a set screen by a relevant information setting section 3 (in the present embodiment, the geometric characteristic setting screen (for the marker, arrow) also serving as the relevant information setting screen 5C for combined use with the set screen by the geometric characteristic setting section 5), and an arrow 17 is then displayed in the spatial orientation information display screen 2A. The geometric characteristic setting section 5 sets the size of the arrow which is such image information object, the texture information to be displayed in the arrow and the like. After the arrow 17 is displayed in the spatial orientation information display screen 2A, a position of the arrow can be changed to an arbitrary place, and can be set to a more desired position.

Finally, the above-described information is output via a data output section 4, and read by the information presenting apparatus, so that a desired function can be realized.

In a case where it is necessary to set a position and a posture of the arrow which is to appear in front of the marker so that the arrow is easily seen by an end user who uses the information presenting apparatus, the position and the posture are set while both of them are displayed in the spatial orientation information display section 2 as in the present embodiment. Thus, it is possible to set an arrangement relation between both of them easily according to more appropriate conditions. For example, when the geometric characteristic setting section 5 sets the size or the shape of the marker, it is possible to set the marker on conditions that the marker can be easily recognized without impairing scenery. When the size, the shape or the like of the image information object (here, the arrow) is set, the image information object (here, rightward arrow) can be set in such a manner that the object is easily seen by the end user, for example, the arrow is prevented from being excessively large and extending beyond the PDA screen. The shape of the object is changed in such a manner that its direction is easily seen, or a three-dimensional arrow is set.

Fourth Embodiment

Next, a data authoring device will be described with reference to FIG. 7 according to a fourth embodiment of the present invention. In the data authoring device according to the present embodiment, a spatial orientation information display section 2 displays in a screen three of spatial orientation information a of the above-described object, spatial orientation information a of a previously decided marker, and spatial orientation information of an image information object. Moreover, there is disposed a geometric characteristic setting section 5 which arbitrarily sets geometric characteristics of the spatial orientation information a of the previously decided marker and the spatial orientation information of the image information object.

Moreover, a PDA provided with a camera is assumed as an information presenting apparatus which is an object. Furthermore, there is considered a case where an image of the marker pasted on a wall is input, and accordingly a 3DCG character is to be seen to emerge in a position a little distant from the wall.

The present embodiment is the data authoring device for the information presenting apparatus (PDA provided with a camera) which satisfies the above-described function.

Figure 7:
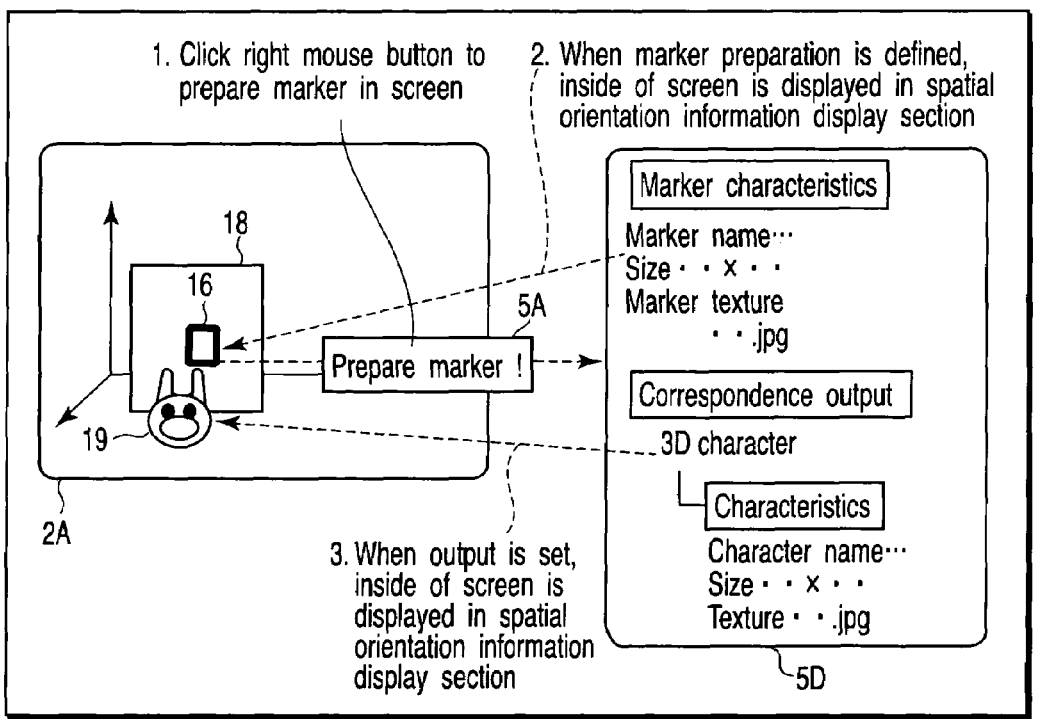
FIG. 7 is a diagram showing a display example in the data authoring device according to a fourth embodiment of the present invention.

When a display screen 10 on a PC is assumed as shown in FIG. 7, and a mouse right button is clicked in the vicinity of a wall 18 in a spatial orientation information display screen 2A, a dialog 5A for marker preparation appears. When the marker preparation is designated, a marker 16 is displayed in the spatial orientation information display screen 2A. Moreover, in the display screen 10, there is displayed a screen (a geometric characteristic setting screen (for the marker, character) also serving as a relevant information setting screen 5D) which sets the geometric characteristics of the marker (corresponding to the geometric characteristic setting section 5). In this geometric characteristic setting screen (for the marker, character) also serving as the relevant information setting screen 5D, a size of the marker, texture information to be displayed in the marker and the like are set. When the geometric characteristics of the marker are set, the geometric characteristics of the marker 16 displayed in the spatial orientation information display screen 2A also change. After the marker is displayed in the spatial orientation information display screen 2A, the position of the marker can be changed to an arbitrary place, and can be set to a more desired position.

After setting this marker, when a 3D character is designated as an output in the setting screen (the geometric characteristic setting screen (for the marker, character) also serving as the relevant information setting screen 5D in the present embodiment) by a relevant information setting section 3, a 3D character 19 is displayed in the spatial orientation information display screen 2A. The geometric characteristic setting section 5 sets a size or the like of the character which is such image information object. After the character 19 is displayed in the spatial orientation information display screen 2A, a position of the character 19 can be changed to an arbitrary place, and set to a more desired position.

Finally, when the above-described information is output via a data output section 4, and read by the information presenting apparatus, a desired function can be realized.

In a case where the desired function of the information presenting apparatus is to be realized, an arrangement relation among the "wall", "marker", and "character" has to be set in consideration of various points such as "a position of the wall where the marker can be pasted", "where to place the marker so that an end user who uses the information presenting apparatus easily sees it", "position and posture to allow the character to appear, which raise directing effects", and "whether the whole character is seen while confirming the marker".

Therefore, when the spatial orientation information of the three are set while three-dimensionally displaying the information in the spatial orientation information display section 2 as in the present embodiment, it is possible to set a positional relation among the three easily on more appropriate conditions while visually confirming the above-described points.

Moreover, the present embodiment has the geometric characteristic setting section 5 which arbitrarily sets the geometric characteristics of the marker and the image information object. Since the size, the shape or the like of the marker can be appropriately set, it is possible to dispose the marker on conditions that the marker is easily recognized without impairing scenery. When the size, the direction or the like of the image information object is appropriately set, the object can be set in such a manner that the object can be easily seen by the end user who uses the information presenting apparatus. For example, the character is prevented from being excessively large or extending beyond the PDA screen. Alternatively, the posture of the object can be set in such a manner that a character's face is easily seen. Thus, as a result, there is an effect that a performance is improved in such a manner as to obtain a desired output in a case where the information presenting apparatus is operated.

Fifth Embodiment

Next, a data authoring device will be described according to a fifth embodiment of the present invention.

Figure 8:
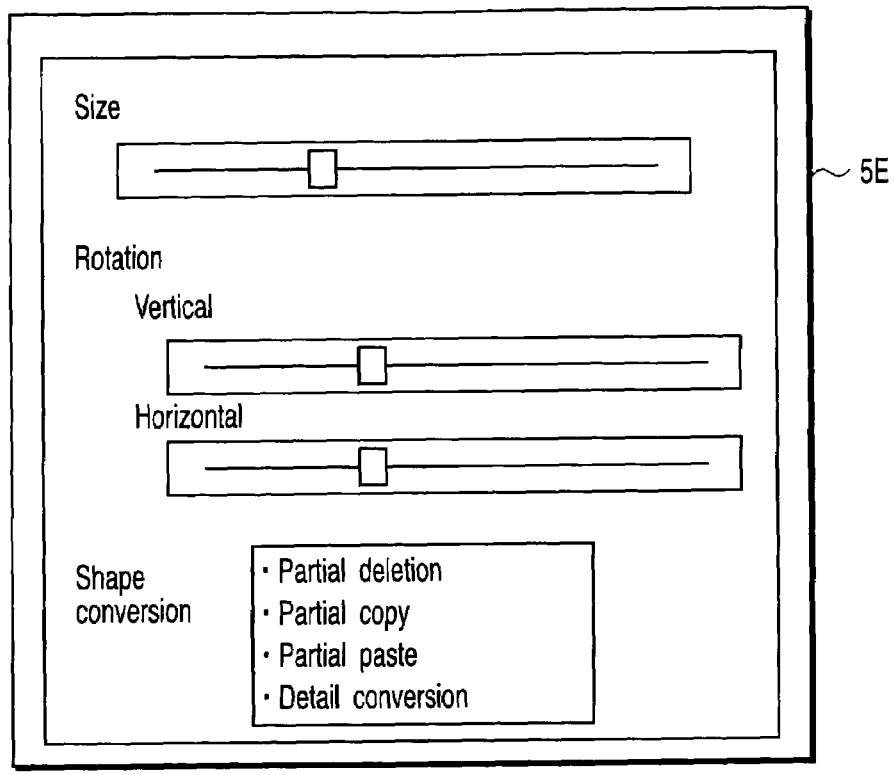
FIG. 8 is a diagram showing a display example in the data authoring device according to a fifth embodiment of the present invention.

In the present embodiment, geometric characteristics include a spatial size, rotation, and a shape, and it is possible to adjust the geometric characteristics of an object, a marker, and an image information object in a geometric characteristic setting screen 5E shown in FIG. 8. As to an effect, when size change, rotation conversion, and shape conversion of the marker are performed in conformity to a marker recognition performance or use environment of the information presenting apparatus, adjustments can be made in such a manner as to obtain more desired outputs. When the size change, rotation conversion, and shape conversion of the image information object are performed, there are effects in setting an image appearing in the information presenting apparatus to be easy to see, or displaying in a screen portions (e.g., character face, etc.) to be seen more. Furthermore, when the size change, rotation conversion, and shape conversion of the object are performed, an actual object is changed/worked in an actual utilization scene, the marker is set to be easier to see, and directing effects can be improved.

Sixth Embodiment

Next, a data authoring device will be described according to a sixth embodiment of the present invention.

Figure 9:
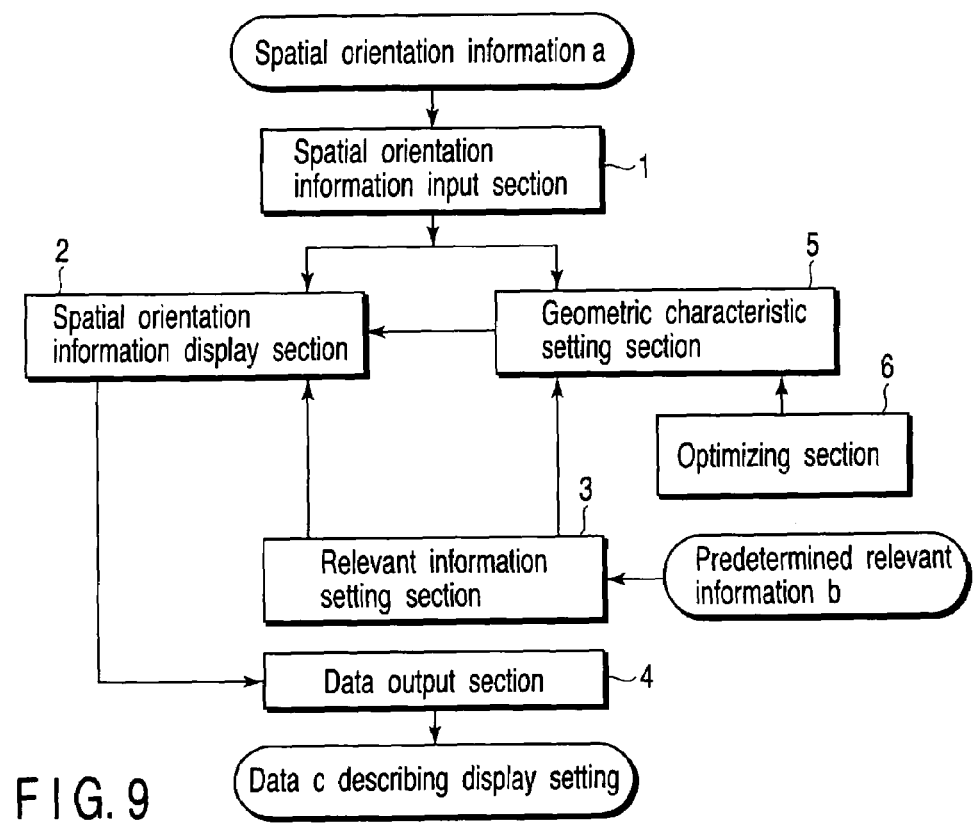
FIG. 9 is a diagram showing a constitution of the data authoring device according to a sixth embodiment of the present invention.

As shown in FIG. 9, the data authoring device according to the present embodiment further comprises an optimizing section 6 in addition to a constitution of the data authoring device according to the second embodiment. This optimizing section 6 has an automatically disposing function such that the surface of a marker spatially comes into contact with that of an object.

That is, it is often considered that the marker is pasted on an actual object in a case where an information presenting apparatus is actually used. In the present embodiment, when a portion of the object where the marker is to be pasted is designated in displaying the marker and the object in a spatial orientation information display section 2, the marker can be automatically disposed in such a manner as to come into contact with the surface on which the marker is to be pasted.

Specifically, it has been described in the above embodiments that when a right mouse button is clicked in the vicinity of a wall in a spatial orientation information display screen 2A to designate marker preparation, the marker appears. In this case, after the marker appears, the right button is clicked to select wall pasting, so that the marker is disposed in such a manner as to come into contact with the wall. As internal processing, the marker may be disposed in such a manner that a normal vector agrees with that of the marker surface from a point designated by an operator of the data authoring device.

It is considered that the displaying is performed, for example, by a three-surface view and a perspective view in the spatial orientation information display section 2. However, in a case where an operator who is not accustomed to such views pastes the marker on the surface, there is a possibility that the marker subtly tilts or detaches. Even for an operator who is accustomed to the views, when the number of the markers increase, troubles increase, and the pasting is laborious. If the marker is pasted on the surface with a simple designating operation as in the present embodiment, any operator can easily set the display regardless of experience, even when the number of the markers increases.

Seventh Embodiment

Next, a data authoring device will be described according to a seventh embodiment of the present invention.

According to the present embodiment, an optimizing section 6 of the data authoring device has a function of automatically setting a spatial region of a marker based on characteristics and use environments of an information presenting apparatus and spatial orientation information of an image information object.

Figure 10:
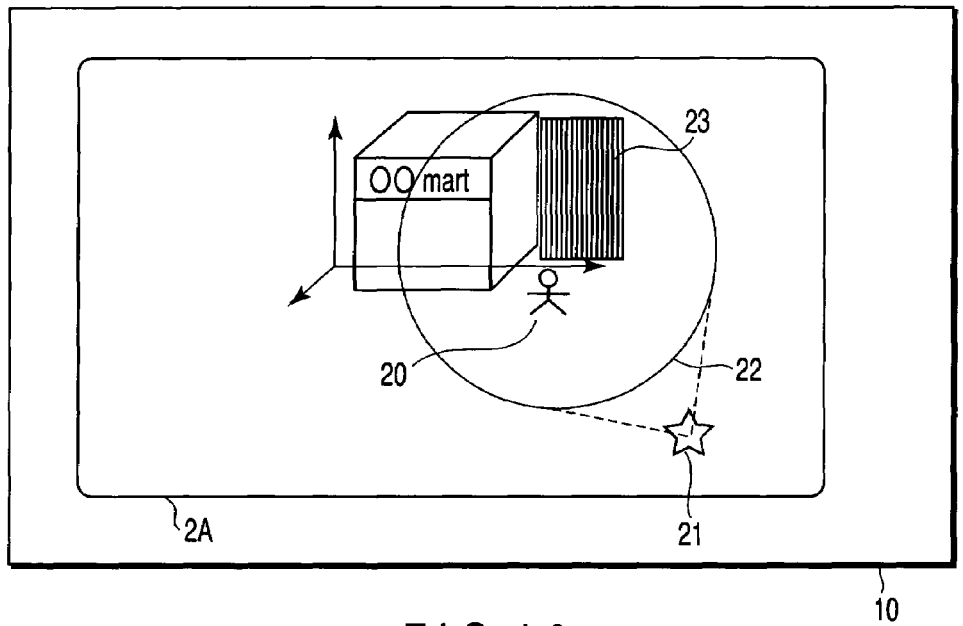
FIG. 10 is a diagram showing a display example in the data authoring device according to a seventh embodiment of the present invention.

Specifically, as shown in FIG. 10, when setting a spatial position (assumed image information object position 20) where the image information object is to appear in a spatial orientation information display screen 2A by a spatial orientation information display section 2, a region (satisfactory marker installing region 22) of the marker to be installed is displayed from field angle data of a camera of the information presenting apparatus and data of an assumed camera position (assumed information presenting apparatus position 21). An operator of the data authoring device may install the marker in an appropriate position in the satisfactory marker installing region 22. In the spatial orientation information display screen 2A, there are displayed regions of a place which is little influenced by outside light, a place where the marker should not be physically pasted (marker installation prohibited region 23), a place where the marker may be pasted and the like.

In a case where the marker is pasted on an actual object in order to use the information presenting apparatus in practice, it is an important point which influences a capability of the information presenting apparatus to consider "where to paste the marker so that it is easily seen by an end user who uses the information presenting apparatus", "where to paste the marker so that it is easily recognized without being influenced by the outside light", "where to paste the marker so that a character is allowed to appear in a designated place" and the like. When the region in which the marker should be installed is automatically set as in the present embodiment, the marker can be set only by an operation of pasting the marker on the region by the operator of the data authoring device. Therefore, the display can be set more easily, and a confirmation test does not have to be performed using the actual information presenting apparatus every time the marker is adjusted.

Eighth Embodiment

Next, a data authoring device will be described according to an eighth embodiment of the present invention.

According to the present embodiment, an optimizing section 6 of the data authoring device has a function of automatically setting a spatial region of an image information object based on characteristics and use environments of an information presenting apparatus and spatial orientation information of a marker.

Figure 11:
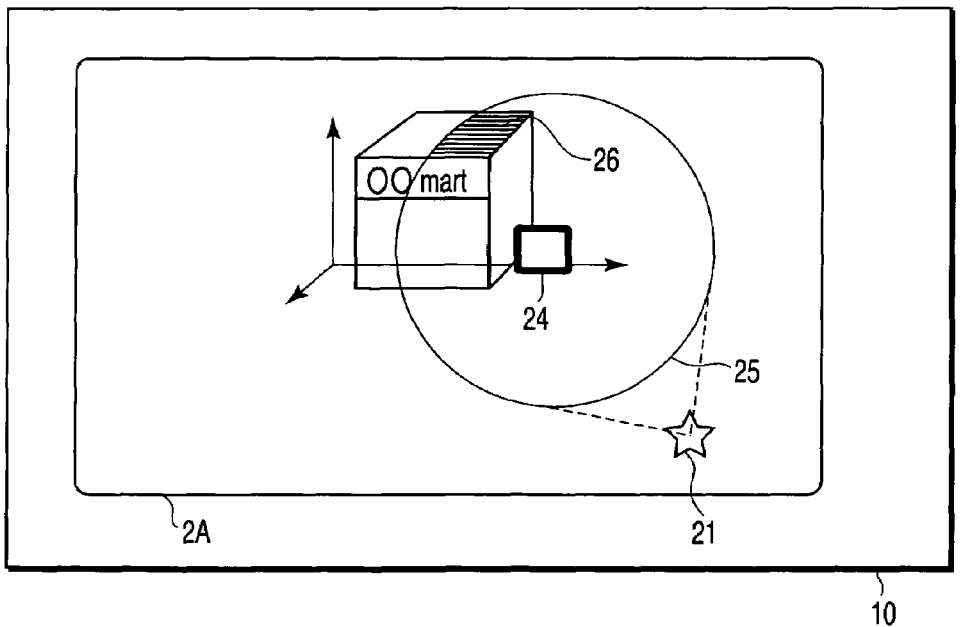
FIG. 11 is a diagram showing a display example in the data authoring device according to an eighth embodiment of the present invention.

Specifically, as shown in FIG. 11, when setting a spatial position (assumed marker position 24) where the marker is to be pasted in a spatial orientation information display screen 2A by a spatial orientation information display section 2, an installation region (satisfactory object installing region 25) of the image information object to be allowed to appear is displayed from a field angle range of a camera of the information presenting apparatus and an assumed camera position (assumed information presenting apparatus position 21). An operator of the data authoring device may install the image information object in an appropriate position in the satisfactory object installing region 25. In the spatial orientation information display screen 2A, there may be displayed a region (object installing condition region 26) which satisfies conditions in a case where the image information object is allowed to appear on desired conditions that the object comes into contact with or does not overlap with an actual object.

In a case where the image information object is allowed to appear while actually using the information presenting apparatus, it is an important point which influences a capability of the information presenting apparatus to consider "which position to install a character so that a character image is allowed to appear while a marker to be actually pasted is taken by the camera", "the character is to be allowed to appear in such a manner that it does not spatially overlap with an actual column", "the character is to be allowed to appear in such a manner as to come into spatial contact with the actual ground", "the character is allowed to appear in such a manner as to cover the marker, so that the marker becomes inconspicuous in the screen of the information presenting apparatus" and the like.

When the region to install the image information object is automatically set as in the present embodiment, the image information object can be set merely by an operation of pasting the object to the region by the operator of the data authoring device. Therefore, the display can be set more easily, and a confirmation test does not have to be performed using the actual information presenting apparatus every time the image information object is adjusted.

Ninth Embodiment

Next, a data authoring device will be described according to a ninth embodiment of the present invention.

Figure 12:
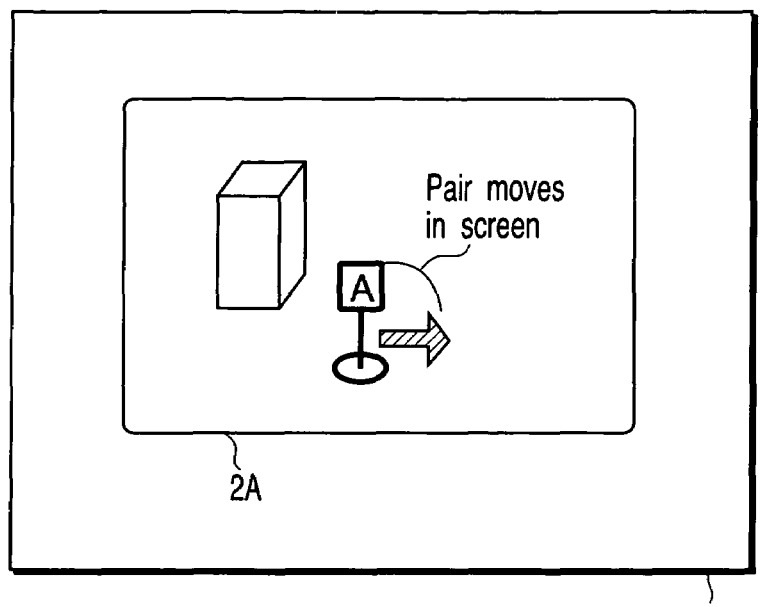
FIG. 12 is a diagram showing a display example in the data authoring device according to a ninth embodiment of the present invention.

According to the present embodiment, an optimizing section 6 of the data authoring device sets positions with respect to an object while relative positions of a marker and an image information object are kept constant. Specifically, as shown in FIG. 12, the positions with respect to the object can be set while the relative positions of the marker and the image information object are kept constant in a spatial orientation information display screen 2A by a spatial orientation information display section 2.

Figure 13:
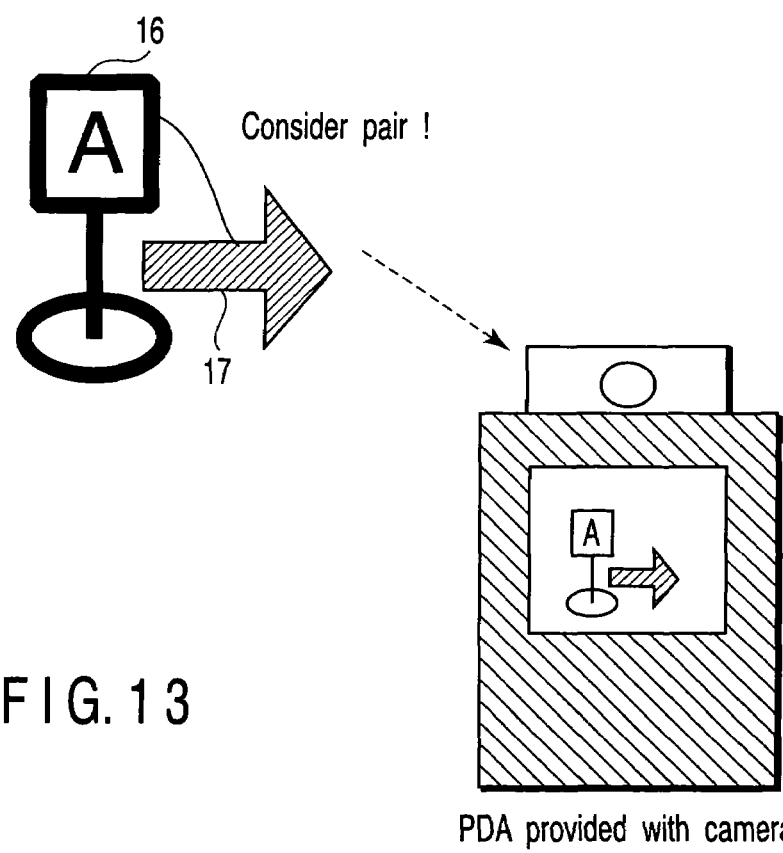
FIG. 13 is an explanatory view of a pair of a marker and an arrow in the ninth embodiment.

The marker and the image information object are handled as a pair of concepts in many cases in actually using an information presenting apparatus. For example, in a case where when the information presenting apparatus inputs an image of the marker, a direction indicating arrow appears in a screen, as shown in FIG. 13, setting of a marker 16 and an appearing arrow 17 as the pair of concepts is easier to see. In this case, specifically, for example, the positions with respect to the object can be set while the relative positions of the marker 16 and the image information object (arrow 17) are kept constant during the displaying in the spatial orientation information display screen 2A. Then, it is possible to set both of the positions of the marker and the image information object simultaneously without successively setting the positions.

When the positions with respect to the object are set while keeping the relative positions of the marker and the image information object constant in this manner, both of the positions can be simultaneously set merely by setting of the positions of the pair for an operator of the data authoring device. Therefore, it is possible to set both of the positions of the marker and the image information object simultaneously without successively setting them, thus it is possible to set the display more easily.

Tenth Embodiment

Next, a data authoring device will be described according to a tenth embodiment of the present invention.

Figure 14:
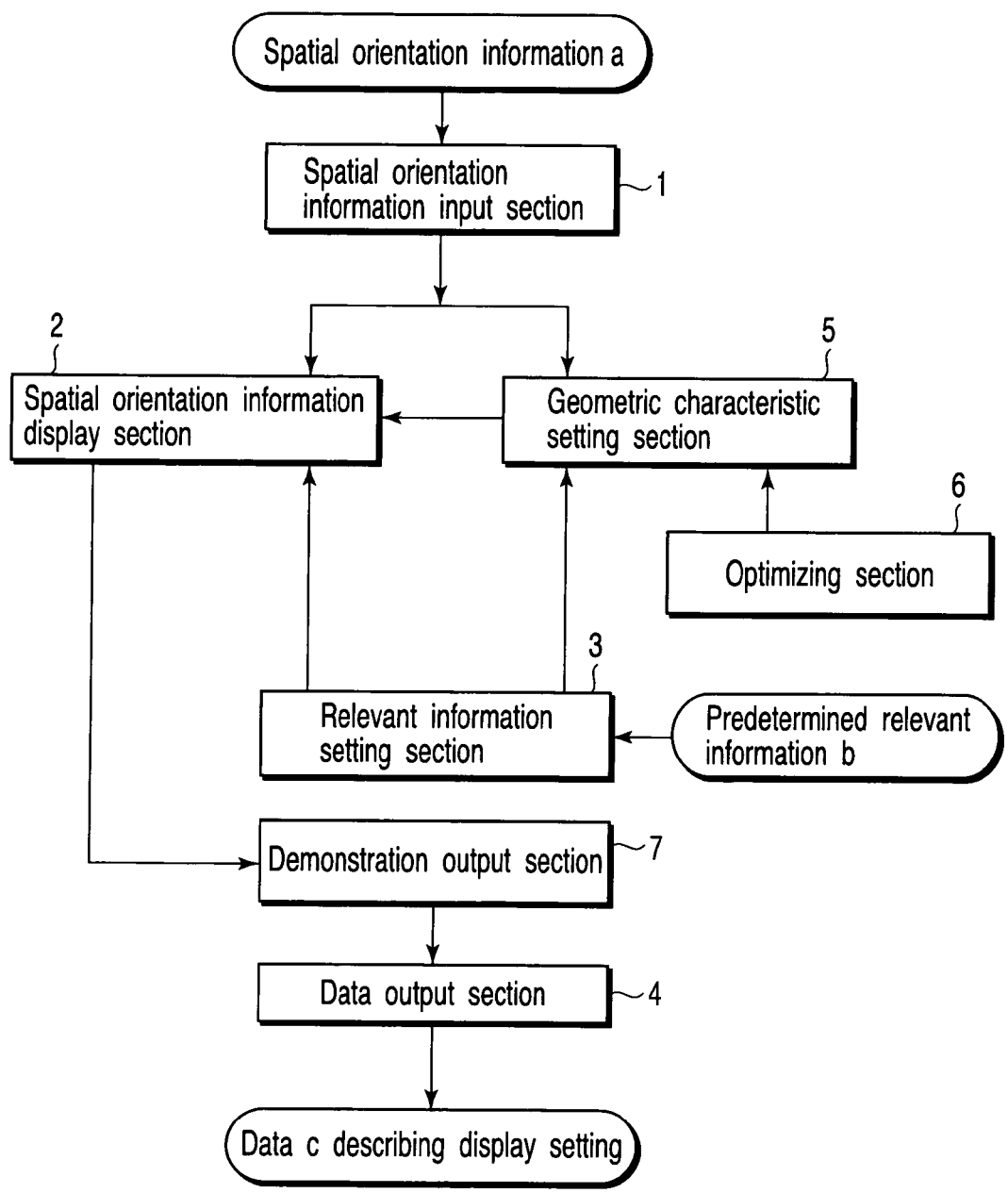
FIG. 14 is a diagram showing a constitution of the data authoring device according to a tenth embodiment of the present invention.

According to the present embodiment, as shown in FIG. 14, the data authoring device further comprises a demonstration output section 7 in addition to a constitution of the data authoring device according to the above-described sixth embodiment. This demonstration output section 7 has a function capable of demonstrating beforehand information to be output from the information presenting apparatus.

Specifically, in the data authoring device according to the present embodiment, a mode referred to as a demonstration mode is prepared, so that the demonstration output section 7 can confirm an output in a desired position or field angle.

That is, the output from the information presenting apparatus can be confirmed to a certain degree at a display setting time in a spatial orientation information display section 2. However, in a case where outputs are ordered and are to be observed in this order, or a case where one desires to confirm the outputs while virtually walking through a path of the real world, the demonstration output section 7 is separately disposed to perform demonstration as in the present embodiment, and it is then possible to experience an output closer to that of an actual information presenting apparatus.

Moreover, a purpose of the spatial orientation information display section 2 is limited to facilitation of setting of the output. Concerning the object, the marker, and the image object, only spatial orientation information having a comparatively light data amount is output, and detailed texture information having a large data amount is set without being displayed. Accordingly, calculation can be speeded up. In this case, in the demonstration output section 7, the texture information may be displayed to perform a final check.

Eleventh Embodiment

Next, a data authoring device will be described according to an eleventh embodiment of the present invention.

Figure 15:
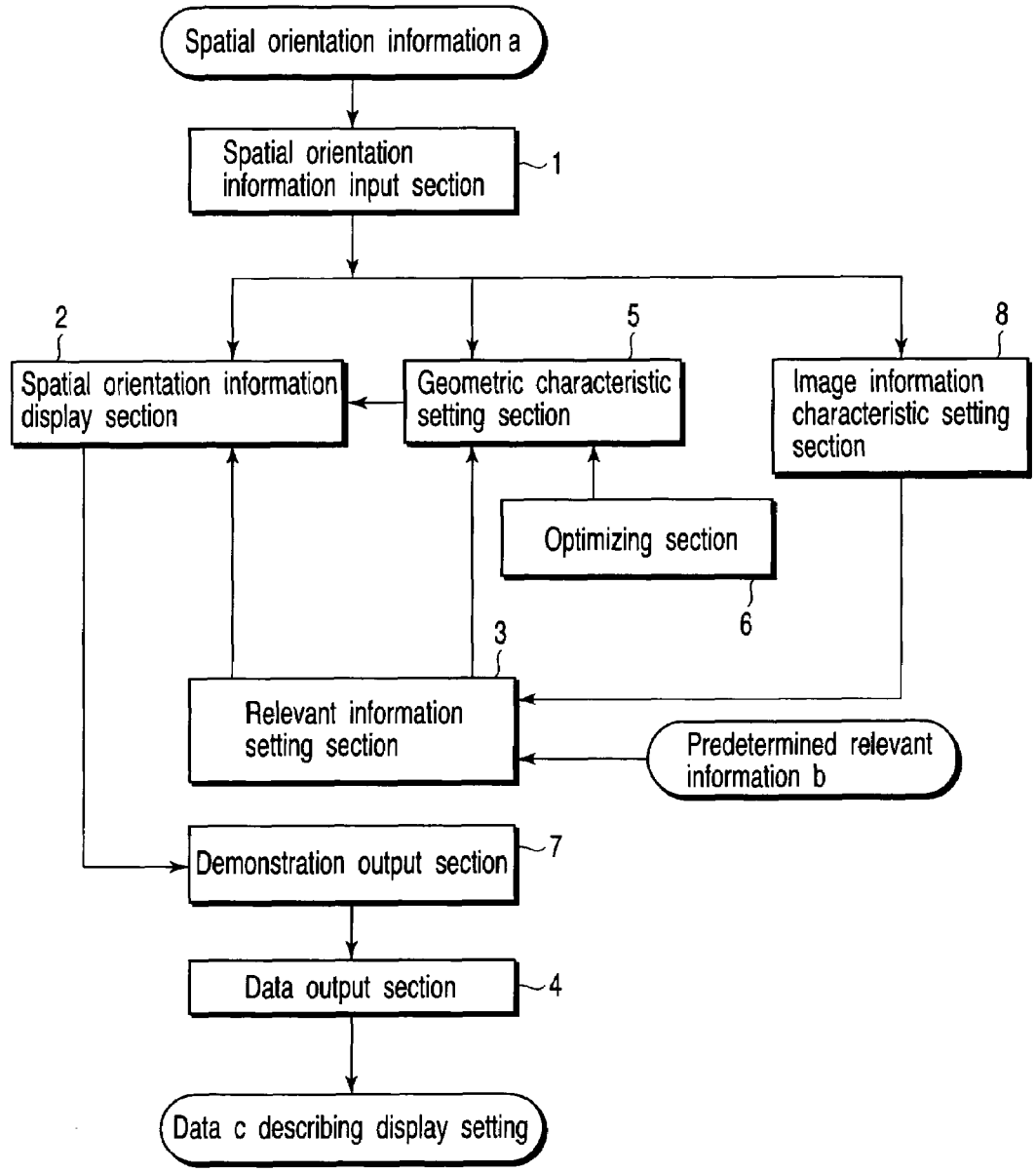
FIG. 15 is a diagram showing a constitution of the data authoring device according to an eleventh embodiment of the present invention.

According to the present embodiment, as shown in FIG. 15, the data authoring device further comprises an image information characteristic setting section 8 in addition to a constitution of the data authoring device according to the tenth embodiment. This image information characteristic setting section 8 arbitrarily sets image information characteristics of an image information object and a previously decided marker.

Specifically, concerning the image information object or the previously decided marker, in addition to geometric characteristics, various types of image information can be set such as image color, brightness, image size, chromatic and monochromatic information, format form, and letter font.

As a result, it is possible to set mainly visual information such as "it is desired that the image information object be conspicuous in contrast to background" and "it is desired that the marker be of an inconspicuous color in contrast to the background". Therefore, it is possible to improve a performance of an actual information presenting apparatus.

Twelfth Embodiment

Next, a data authoring device will be described according to a twelfth embodiment of the present invention. In the present embodiment, an image information object is an image having a three-dimensional coordinates.

That is, in a case where the image information object is output, a spatial arrangement to output the object is a more important point, but especially in a case where the image utilizes the three-dimensional coordinates, the way it appears largely differs with the arrangement or a posture. In this case, when spatial orientation information of the image information object is displayed in a spatial orientation information display section 2 to perform display setting, the setting is performed easily by an operator of the data authoring device, and it is additionally possible to make an adjustment in such a manner as to obtain more desired outputs. That is, the spatial orientation information for use is not limited to a two-dimensional plane, arbitrary handling can be easily set, and it is possible for the operator to make the adjustment in such a manner as to obtain the desired output.

Thirteenth Embodiment

Next, a data authoring device will be described according to a thirteenth embodiment of the present invention. In the present embodiment, an image information object has letter information.

That is, in an information presenting apparatus, a letter may be three-dimensionally prepared in a three-dimensional CG, allowed to emerge in a space, and displayed, or a plane of a certain size including the letter information may be allowed to emerge in the space and displayed (virtual signboard, etc.). In any case, the display is set in such a manner as to obtain a desired output during the displaying in a spatial orientation information display section 2. It is to be noted that in a case where the letter information (possibly including image information) is to be displayed in a whole screen in the information presenting apparatus, spatial orientation information does not have to be considered. Therefore, "whole screen display" may be set in a relevant information setting section 3 without displaying any information in the spatial orientation information display section 2.

Fourteenth Embodiment

Next, a data authoring device will be described according to a fourteenth embodiment of the present invention. In the present embodiment, at least two pieces of predetermined relevant information can be set with respect to the same object of the real world, or the same previously decided marker.

In this case, for example, even in a case where the same marker is seen as a case where an information presenting apparatus is utilized, setting can be made depending on time in such a manner that a rightward arrow appears in the morning, and a leftward arrow appears in the evening.

Fifteenth Embodiment

Next, a data authoring device will be described according to a fifteenth embodiment of the present invention. In the present embodiment, a plurality of the same type of outputs having different data capacities can be set as a predetermined association with respect to the same object of the real world or the same previously decided marker.

That is, there is considered a case where a PC version, a PDA version, and a cellular phone version which realize similar functions are all prepared as objects of an information presenting apparatus. In this case, it is laborious to perform data authoring for each apparatus. However, performances differ with the respective apparatuses, and especially memory capacities and graphic processing performances have large differences. Therefore, even the same type of predetermined relevant information has to be prepared with changed capacities. For example, a polygon number in 3DCG is changed, or a texture capacity is converted. However, it is laborious to perform the data authoring anew for each apparatus. Therefore, when the plurality of the same type of outputs having different data capacities can be set as the predetermined association as in the present embodiment, it is possible to perform the authoring only once and handle the respective apparatuses.

Sixteenth Embodiment

Figure 16:
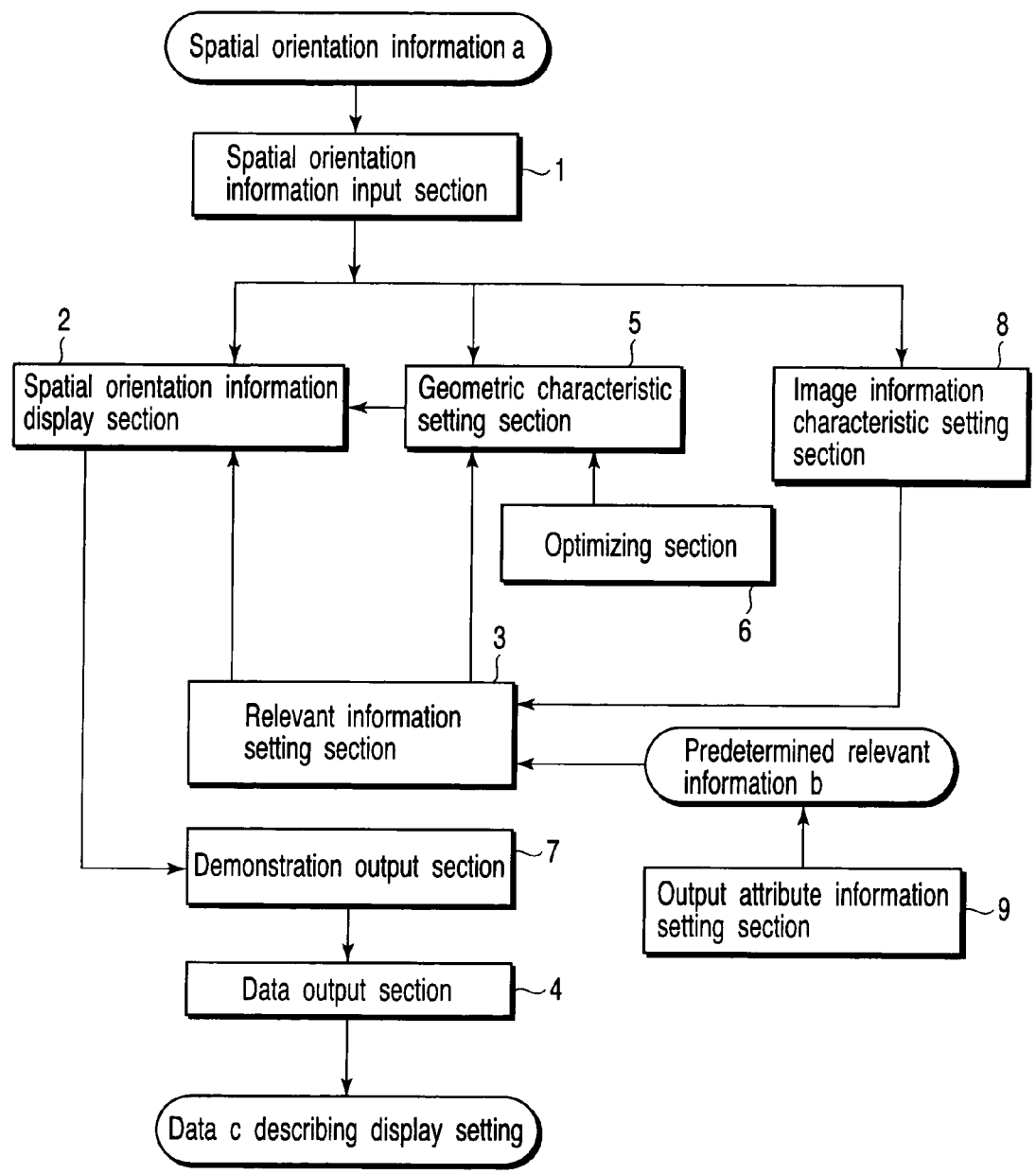
FIG. 16 is a diagram showing a constitution of the data authoring device according to a sixteenth embodiment of the present invention.

Next, a data authoring device will be described according to a sixteenth embodiment of the present invention. According to the present embodiment, as shown in FIG. 16, the data authoring device further comprises an output attribute information setting section 9 capable of setting output attribute information in addition to a constitution of the data authoring device according to the eleventh embodiment.

Here, as the output attribute information which can be set by the output attribute information setting section 9, there are a timing (immediately or a certain time after the marker is seen) to output information, a magnitude (whether or not to output a large sound volume) of voice, brightness (brightened in outdoor utilization) of an image to be output, a resolution (changed with an apparatus performance of the information presenting apparatus) of the image to be output, a data amount (changed with the kind of object) of the image to be output, and information (hue is changed with the kind of screen of the information presenting apparatus) defined by the characteristics or the use environments of the information presenting apparatus.

Since the present embodiment has the output attribute information setting section 9 capable of setting these output attribute information, the adjustment can be made so that more desired relevant information can be output.

Seventeenth Embodiment

Next, a seventeenth embodiment of the present invention will be described. A constitution of a data authoring device according to the present embodiment is similar to that of the data authoring device according to the above-described first embodiment.

In the present embodiment, spatial orientation information a (three-dimensional coordinates data of ○ ○ mart) of the object in the above-described first embodiment, and spatial orientation information a of a previously decided marker are extracted from a signboard by a three-dimensional CAD and three-dimensional design information of a store.

Specifically, the signboard and the store are designed in three-dimensional CAD, and the "marker" is set to attribute information in the three-dimensional design information of the signboard. It is to be noted that here the three-dimensional design information means various types of that required for manufacturing/installing the object, such as a shape, color, material, name, component name, and coordinates. The information on the shape, coordinates and the like extracted from the three-dimensional design information is referred to as shape information, and extracted information on attributes other than those of the above-described shape information, such as the color, material, name, and component name is referred to as attribute information.

Moreover, in the data authoring device according to the present embodiment, a spatial orientation information input section 1 reads the three-dimensional design information of the signboard and the store by the three-dimensional CAD, and extracts spatial orientation information a (three-dimensional coordinates data of ○○ mart) of the object and spatial orientation information a (coordinates data of the signboard) of the signboard in which the "marker" is set to the attribute information. The extracted spatial orientation information a is displayed in the spatial orientation information display section 2.

Furthermore, a relevant information setting section 3 reads the three-dimensional design information of the signboard and the store by the three-dimensional CAD, and extracts predetermined relevant information b such as the shape and the name of the object or the signboard. The extracted predetermined relevant information b is displayed in the spatial orientation information display section 2.

Since the subsequent processing is the same as that of the first embodiment, description thereof is omitted.

Eighteenth Embodiment

Next, an eighteenth embodiment of the present invention will be described. A constitution of a data authoring device according to the present embodiment is similar to that of the data authoring device according to the above-described first embodiment.

For example, a marker is installed in order to perform association (registration) of a real space which is a coordinates system inherent in an object with a model space which is a coordinates system inherent in three-dimensional design information of the object. This marker is designed simultaneously with the designing the object using a three-dimensional CAD. That is, first, the three-dimensional design information of the object is prepared using the three-dimensional CAD. Next, the three-dimensional design information of the marker is prepared. As to the marker, for example, a component name is set to the "marker". The object and the marker are disposed in a model space coordinates system in the three-dimensional CAD.

A spatial orientation information display section 2 of the data authoring device reads the three-dimensional design information of the object prepared in this three-dimensional CAD, and that of the marker, and extracts the respective spatial orientation information a from the three-dimensional design information. Data for an information presenting apparatus is output based on this spatial orientation information a. Specifically, the spatial orientation information input section 1 of the data authoring device extracts information having the component name "marker" from the three-dimensional design information of the object and the marker, and extracts a marker shape, a marker name, and coordinates data of the marker from the three-dimensional design information whose component name is the "marker". A shape of the object, a name of the marker, and coordinates data of the marker are extracted from the three-dimensional design information whose component name is the "marker". Similarly, the shape of the object, the name of the object, and the coordinates data of the object are extracted from the three-dimensional design information of the object. Coordinates data of the marker and that of the object are the respective spatial orientation information a. The shape of the marker, the name of the marker, the shape of the object, and the name of the object are predetermined relevant information b displayed in the information presenting apparatus, and input into a relevant information setting section 3.

Alternatively, the relevant information setting section 3 reads the three-dimensional design information of the object prepared in the three-dimensional CAD and that of the marker, and may extract the predetermined relevant information b of them from the three-dimensional design information.

It is to be noted that the marker set by the data authoring device needs to be pasted on the real world in order to display the relevant information in the information presenting apparatus, but a pasting position is obtained from an arrangement relation between the object and the marker in the three-dimensional CAD. The marker is disposed in the real world by use of information on the arrangement relation in this three-dimensional CAD.

Here, in a case where the marker is first pasted on the real world, a relation (position and posture) between the object and the marker in the model space is modified, and accordingly the registration of the real space and the model space is performed.

Figure 17A:
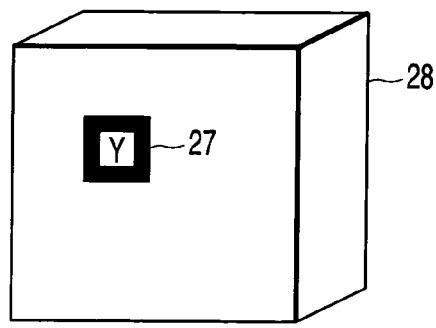
FIG. 17A is a diagram showing an object before completion of a registration operation in a case where the marker is first pasted.
Figure 17D:
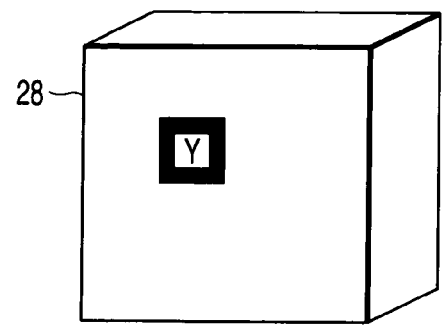
FIG. 17D is a diagram showing an object after the completion of the registration operation in the case where the marker is first pasted.
Figure 17B:
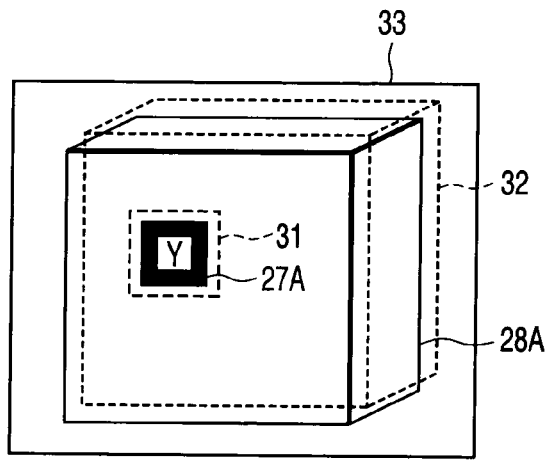
FIG. 17B is a diagram showing a display state before the completion of the registration operation in the case where the marker is first pasted.
Figure 17E:
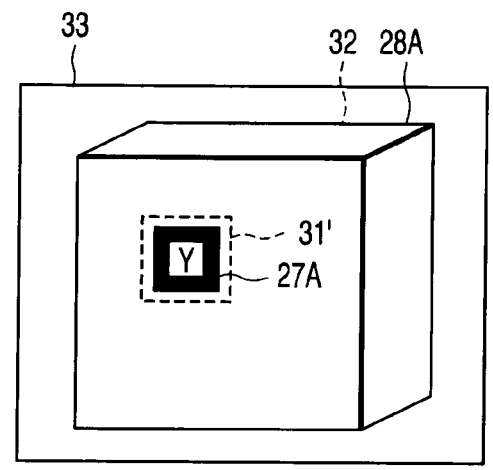
FIG. 17E is a diagram showing a display state after the completion of the registration operation in the case where the marker is first pasted.
Figure 17C:
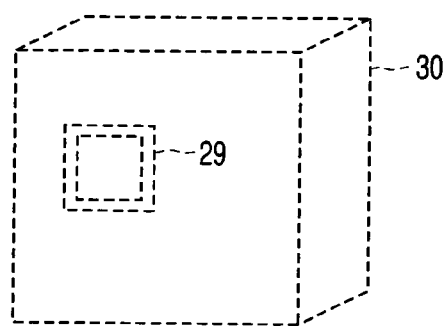
FIG. 17C is a diagram showing shape information of the object before the completion of the registration operation in the case where the marker is first pasted.

FIGS. 17A to 17C are diagrams showing an object (17A), a display state (17B), and shape information (17C) of the object before completion of a registration operation in a case where the marker is first pasted. An object 28 (FIG. 17A) to which a marker 27 is pasted is photographed to obtain an image 27A of the marker and an image 28A (FIG. 17B) of the object. Moreover, a model 31 of the marker and an object model 32 are produced from shape information 29 of the marker and shape information 30 (FIG. 17C) of the object, and superimposed and displayed on a screen 33. At this time, since the marker 27 is used as a reference, the image 27A of the marker agrees with the shape information 29 of the marker. Therefore, although the image 27A displayed in the screen 33 agrees with the model 31 of the marker, the image 28A of the object and the object model 32 are displaced and displayed. At this time, since the already pasted marker 27 cannot be moved, the position and posture of the shape information 29 of the marker with respect to the shape information 30 of the object are moved to obtain shape information 29'.

Figure 17F:
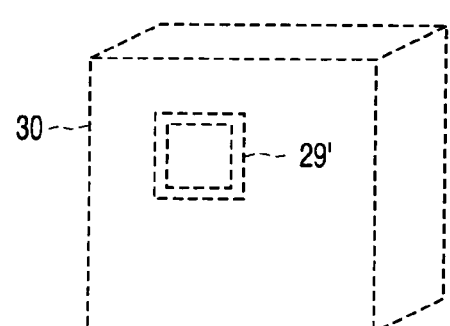
FIG. 17F is a diagram showing shape information of the object after the completion of the registration operation in the case where the marker is first pasted.

FIGS. 17D to 17F are diagrams showing an object (17D), a display state (17E), and shape information (17F) of the object after the completion of the registration operation. According to the registration operation, the image 27A of the marker displayed in the screen 33 agrees with a model 31' whose marker has been moved, and the image 28A of the object also agrees with an object model 32 (FIG. 17E). Moreover, when the shape information 29' (FIG. 17F) of the above-described marker after being moved is input into a spatial orientation information input section 1, it is possible to extract spatial orientation information a which agrees with the marker 27 actually pasted on the object 28.

Moreover, in a case where the marker is later pasted, a relation (position and posture) between the object and the marker in the real space is modified, and, accordingly, registration of the real space and the model space is performed.

FIGS. 18A to 18C are diagrams showing an object (18A), a display state (18B), and shape information (18C) of the object before completion of a registration operation in a case where the marker is later pasted. An object 28 (FIG. 18A) to which a marker 27 is pasted is photographed to obtain an image 27A of the marker and an image 28A (FIG. 18B) of the object. Moreover, a model 31 of the marker and an object model 32 are produced from shape information 29 of the marker and shape information 30 (FIG. 18C) of the object, and superimposed and displayed on a screen 33. At this time, since the marker 27 is used as a reference, the image 27A of the marker agrees with the shape information 29 of the marker. Therefore, although the image 27A of the marker displayed in the screen 33 agrees with the model 31 of the marker, the image 28A of the object and the object model 32 are displaced and displayed. Therefore, when the position of the actual marker 27 with respect to the object 28 is moved, the object 28 is matched with the shape information 30 of the object. That is, an image observer moves the position of the marker 27 so that both of the image and the object model are matched while observing the image 28A of the photographed object and the object model 32 which are displayed in the screen 33.

FIGS. 18D to 18F are diagrams showing an object (18D), a display state (18E), and shape information (18F) of the object after the completion of the registration operation. According to the registration operation, the image 27A of the moved marker displayed in the screen 33 agrees with the model 31 of the marker, and the image 28A of the object also agrees with the object model 32 (FIG. 18E).

The present invention has been described above based on the embodiments, but the present invention is not limited to the above-described embodiments, and needless to say, various modifications and applications are possible within the scope of the present invention.

For example, in the above-described embodiments, for convenience of description, the screens by the respective sections such as the spatial orientation information display section 2, the geometric characteristic setting section 5, and the relevant information setting section 3 are represented as if they were independent in the GUI, but the respective sections (respective screens) may be mixed and disposed in the same window. The GUI may be prepared so that it is easy to use for the operator of the data authoring device, when the respective functions are achieved.

Moreover, it is also considered that the function of the data authoring device of the present invention is provided via a network such as the Internet. In this case, when the data c describing the display setting is stored or read in the information presenting apparatus, utility rates may be collected by charging or the like.

Moreover, in the seventeenth and eighteenth embodiments, the three-dimensional design information is prepared from the three-dimensional CAD, but, needless to say, two-dimensional design information (design information of XY-plane, XZ-plane, and YZ-plane) prepared using a two-dimensional CAD may be used and converted into the three-dimensional design information (XYZ plane). Furthermore, the spatial orientation information is extracted from the shape information, but, needless to say, the spatial orientation information (e.g., coordinates data) may be described beforehand in the attribute information with the three-dimensional CAD, and this may be extracted.

Nineteenth Embodiment

A nineteenth embodiment of the present invention will be described. In the present embodiment, in the seventh embodiment described with reference to FIG. 10, there is provided a specific method of determining marker spatial orientation information based on spatial orientation information of an object and use conditions of an information presenting apparatus. Here, simultaneously with preparation of design information of the object, information is prepared for registering a real world and a model space. Specifically, there are prepared installing information, photographing conditions and the like of a marker which is a reference at a time of displaying of relevant information near the object which is to be designed in a three-dimensional CAD, for example, superimposing/displaying of a shape, name or the like of the object.

Figure 19:
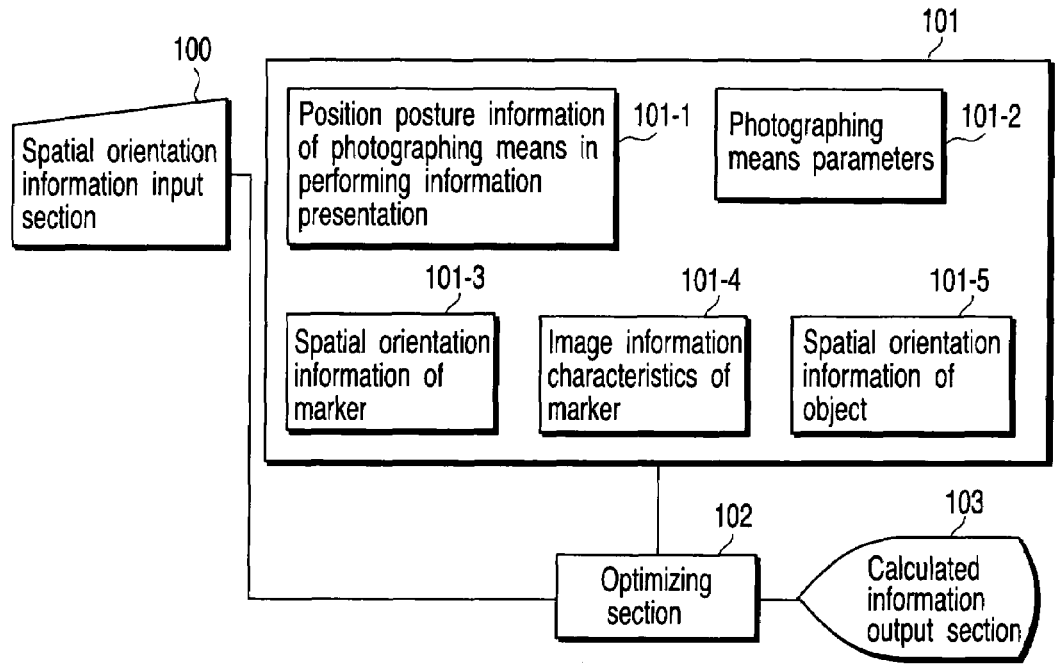
FIG. 19 is a diagram showing a constitution of the data authoring device according to a nineteenth embodiment of the present invention.

FIG. 19 is a diagram showing a constitution of a data authoring device according to the nineteenth embodiment. A spatial orientation information input section 100 is a section which inputs spatial orientation information of an object and/or a previously decided marker, and corresponds to the spatial orientation information display section 2 of FIG. 9. A storage device 101 can store: photographing means parameters 101-2 which are parameters of photographing means constituting an information presenting apparatus; position posture information 101-1 of the photographing means at a time when the information presenting apparatus performs information presentation; spatial orientation information 101-3 of the marker; image information characteristics 101-4 of the marker; and spatial orientation information 101-5 of the object.

An optimizing section 102 calculates a value of at least one remaining information that has not been input in an information group or a range in which the value can be taken based on input information from the spatial orientation information input section 100 including at least the spatial orientation information 101-5 of the object in the information group consisting of: the photographing means parameters 101-2; the position posture information 101-1 of the photographing means; the spatial orientation information 101-3 of the marker; the image information characteristics 101-4 of the marker; and the spatial orientation information 101-5 of the object. A calculated information output section 103 is a section which corresponds to the data output section 4 of FIG. 9, and here outputs an input value or a value obtained from the input value in the photographing means parameters 101-2, the position posture information 101-1 of the photographing means, the spatial orientation information 101-3 of the marker, the image information characteristics 101-4 of the marker, and the spatial orientation information 101 of the object.

Here, the spatial orientation information 101-5 of the object includes two or more of: position posture information of the object; shape size information; a region photographed during performing of information presentation; a region where the photographing means can exist; position posture information of at least the object of a region in which the marker can be installed; and shape information.

Moreover, as information input from the spatial orientation information input section 100, there are the spatial orientation information of the object, the photographing means parameters, and the image information characteristics of the marker.

Furthermore, the photographing means parameters 101-2 have two or more of information including a field angle of the photographing means, a resolution, the number of pixels required for recognizing the marker, and at least the field angle and resolution of image distortion information.

Additionally, the position posture information 101-1 of the photographing means at a time of performing the information presentation has position information and posture information at the time of performing the information presentation, and has a plurality of pieces of position information and posture information in a case where the photographing for performing the information presentation is performed in a plurality of places.

Moreover, the spatial orientation information 101-3 of the marker includes a position and a posture in which the marker is installed, and a shape and a size of the marker which are geometric characteristic information.

Furthermore, the image information characteristics 101-4 of the marker includes an attribute and the type of marker, mainly texture information.

Figure 20:
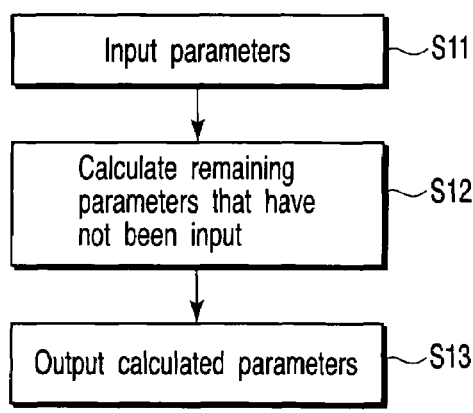
FIG. 20 is an explanatory view showing a function of the data authoring device according to the nineteenth embodiment of the present invention.

FIG. 20 is an explanatory view of a function of the data authoring device according to the nineteenth embodiment of the present invention. First, in the information group including: the photographing means parameters 101-2; the position posture information 101-1 of the photographing means; the spatial orientation information 101-3 of the marker; the image information characteristics 101-4 of the marker; and the spatial orientation information 101-5 of the object, for example, the spatial orientation information 101-5 of the object and the photographing means parameters 101-2 are input as input parameters into the optimizing section 102 via the spatial orientation information input section 100 (step S11). The optimizing section 102 calculates remaining parameters that have not been input (here, the position posture information 101-1 of the photographing means, the spatial orientation information 101-3 of the marker, and the image information characteristics 101-4 of the marker) with reference to the storage device 101 (step S12). Next, the calculated parameters are output from the calculated information output section 103 (step S13).

A specific application example of the above-described data authoring device will be described hereinafter. A factory, a car navigator, a construction site and the like are considered, but here, the inside of the factory will be described as an example.

Figure 21:
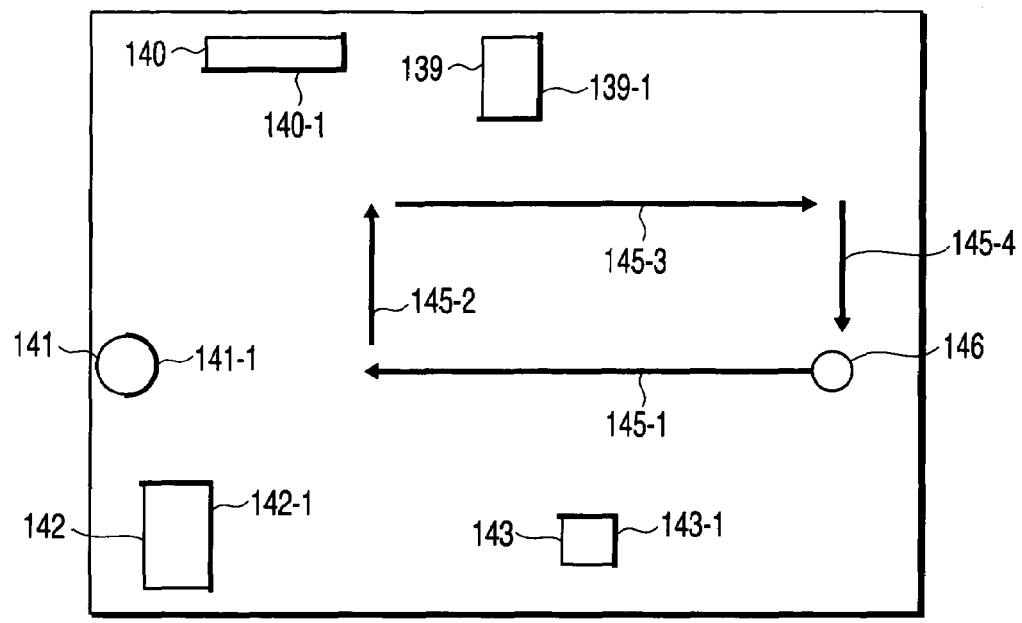
FIG. 21 is an explanatory view of a specific application example of the data authoring device.

FIG. 21 shows a display example of the inside of the factory as viewed from above. Here, there is considered preparing of installing information, photographing conditions and the like of the marker or the like which is a reference in superimposing/displaying the shape, the name and the like of the object in the vicinity of various objects (buildings) to be designed with a three-dimensional CAD.

First, by inputs from the spatial orientation information input section 100, the storage device 101 stores: positions/postures and shape information of objects 139 to 143 shown in FIG. 21; and information on surfaces 139-1 to 143-1 (represented by bold lines in the figure) of the respective objects which need to be checked and passage routes 145-1 to 145-4 (represented by bold arrows in the figure) of an inspector 146. Furthermore, the storage device 101 stores the photographing means parameters such as the field angle and the resolution of the photographing means for use in inspection. Other usable information on the marker is stored in the storage device 101. The optimizing section 102 determines the optimum inspection photographing place and direction, marker installing position and posture, and marker size and type from various information stored in the storage device 101, and outputs them via the calculated information output section 103.

For example, when the input information are the position, posture, and shape information of the objects 139 to 143, the surfaces 139-1 to 143-1 of the respective objects 139 to 143 required to be checked, the marker installable region, and the passage route of the inspector 146, the inspection photographing place and direction, the marker installing position and posture, the marker size and type, and the photographing means parameters of the photographing means for use are output as the remaining information that has not been input.

In this case, the information to be output is not limited to one way, and is sometimes output in a certain range. When the inspector 146 selects a specific value from the range to be output in consideration of trade-offs such as the number of markers needed to be installed, and the size, settings concerning the marker and the photographing can be easily decided. It is also possible to designate a certain value or a narrower range from a specific information range output in response to the input, and re-calculate a value or a range that can be taken by the remaining information.

Moreover, as another example, when the input information are the photographing means parameters, the position, posture, and shape information of the objects 139 to 143, the surfaces 139-1 to 143-1 of the respective objects 139 to 143 needed to be checked, the marker installable region, and the passage routes 145-1 to 145-5 of the inspector 146, the information output as the remaining information that has not been input are the marker installing position and posture, the marker size and type, and the inspection photographing place and direction. When a plurality of markers are needed to be used, a combination of the markers in which erroneous recognition does not easily occur is calculated from the registered marker types. This includes a meaning that a relation of the positions and postures of the plurality of markers is calculated in such a manner that the position posture information of the photographing means can be calculated with a higher precision, in addition to judgment that a set of markers having high-similarity textures is prevented from being selected. For example, in a case where the position and posture of the photographing means are calculated from a plurality of markers in an image photographed by the photographing means, when a difference between coordinates values of a camera coordinates system XYZ of the photographing means is as large as possible with regard to a positional relation among the plurality of markers, the position and posture of the photographing means can be calculated. This is because the plurality of markers can be handled as one large marker. Especially, conditions that the difference of the positional relation among the plurality of markers in a Z-axis direction (photographing means depth direction) is large are preferable for calculating the position and posture of the photographing means with a satisfactory precision. In a case where the combination of the marker in which the erroneous recognition does not easily occur is calculated, the positional relation among the plurality of markers is a judgment standard as described above.

Figure 22:
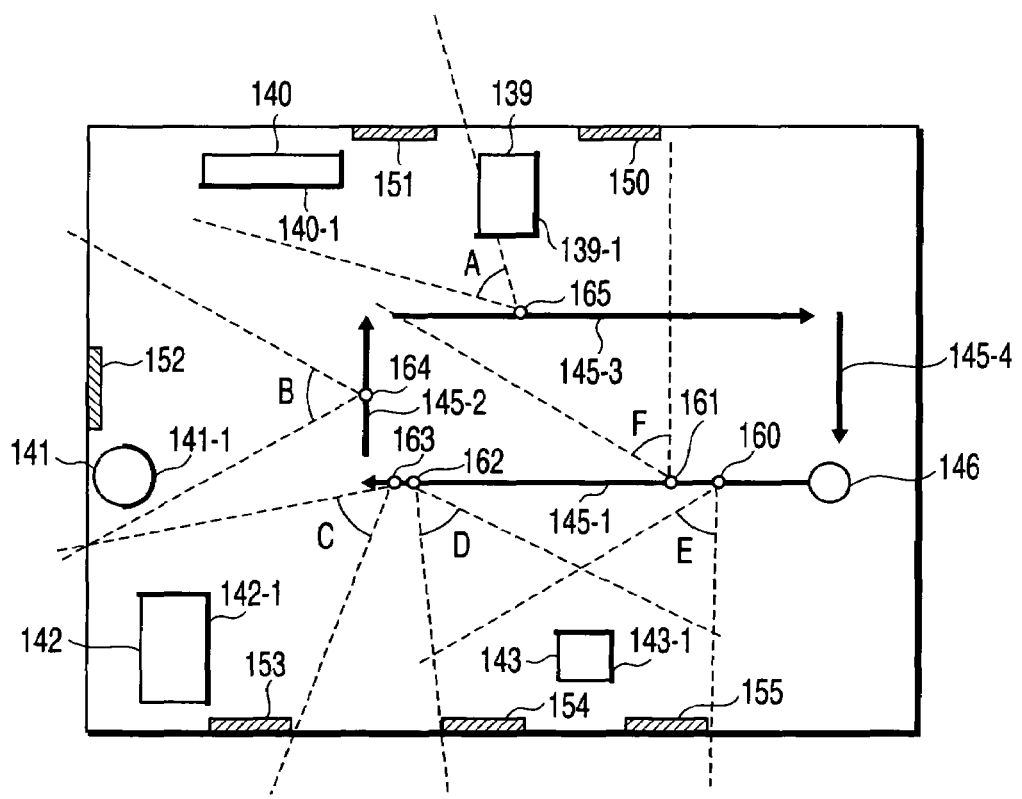
FIG. 22 is a diagram showing one example of information presentation at a time when a calculated information output section is realized by a display device.

FIG. 22 shows one example of information presentation at a time when the calculated information output section 103 is realized by the display device. Markers 150 to 155 are displayed in the vicinity of the respective objects 139 to 143. A camera 165 is displayed as the photographing means having a visual field A in which the object 140 and the marker 151 can be photographed. There is also displayed a camera 164 having a visual field B in which the object 141 and the marker 152 can be photographed. There is also displayed a camera 163 having a visual field C in which the object 142 and the marker 153 can be photographed. There is also displayed a camera 162 having a visual field D in which the object 143 and the markers 154, 155 can be photographed. There is also displayed a camera 160 having a visual field E in which the object 143 and the markers 154, 155 can be photographed. There is also displayed a camera 160 having a visual field F in which the objects 139, 140 and the markers 150, 151 can be photographed.

Figure 23:
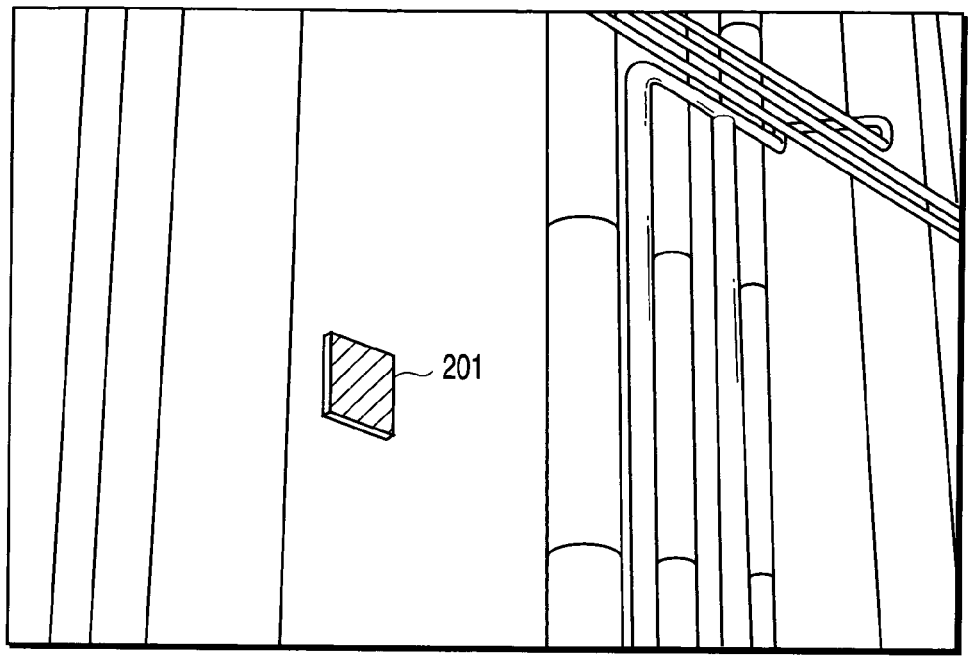
FIG. 23 is a diagram showing one example of an image output in a case where the object is seen from an arbitrary visual point in response to an input from a spatial orientation information input section.
Figure 24:
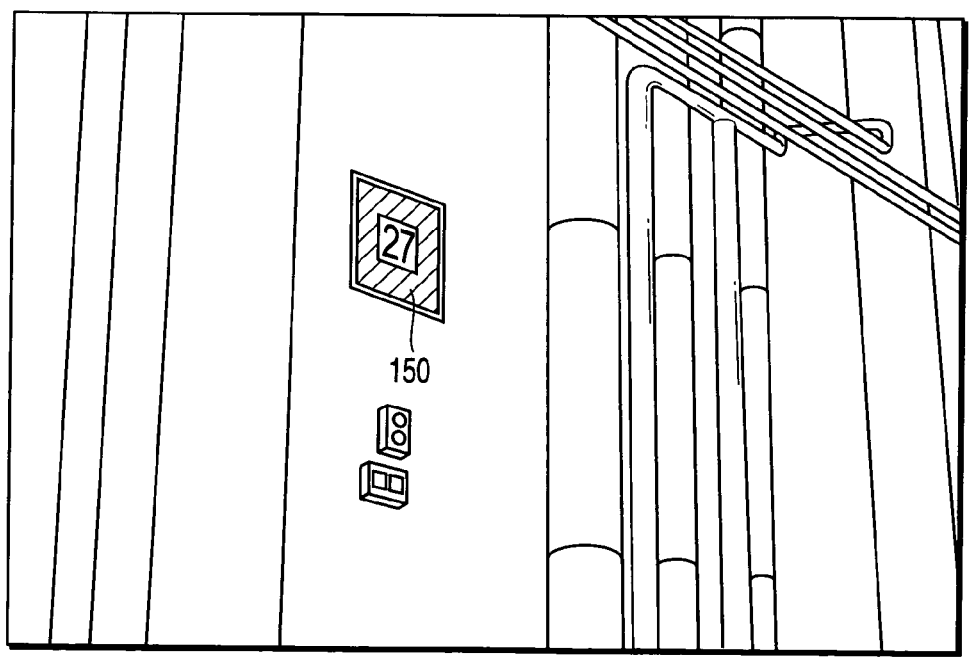
FIG. 24 is a diagram showing another example of the image output in the case where the object is seen from the arbitrary visual point in response to the input from the spatial orientation information input section.

Moreover, the output information does not have to be two-dimensional information shown in FIGS. 21, 22, and an image may be output in a case where the objects 139 to 143 are viewed from an arbitrary visual point in response to an input from the spatial orientation information input section 100. FIGS. 23, 24 show one example of an image output in this case. FIG. 23 shows a CAD display by simulation, and a place 201 where the marker is to be installed is shown. FIG. 24 shows display of a photographed image in the real space, and shows that the marker 150 is pasted on a wall.

According to the above-described nineteenth embodiment, since the installing information and the photographing conditions of the marker or the like are presented beforehand, the number of steps of installing the marker can be remarkably reduced in a marker installing operation which is preparation for the information presentation.

Twentieth Embodiment

A twentieth embodiment of the present invention will be described hereinafter. The twentieth embodiment relates to a support in installing a marker based on spatial orientation information of the set marker. More specifically, a first marker is installed based on the spatial orientation information of the marker. An information presenting apparatus is used with respect to the first marker. The information presenting apparatus presents the spatial orientation information of second and subsequent markers in the same manner as in information presentation concerning an object (treats the marker as the object), and supports the installation of the marker.

Figure 25:
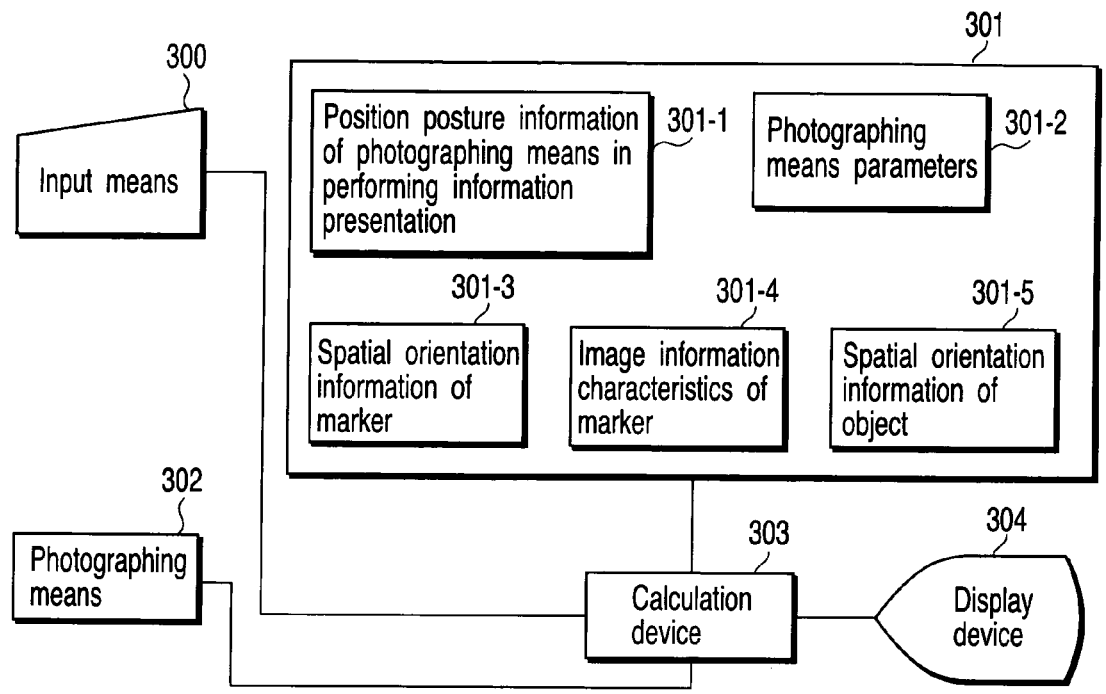
FIG. 25 is a diagram showing a constitution of an information presenting apparatus according to a twentieth embodiment.

FIG. 25 is a diagram showing a constitution of the information presenting apparatus according to the twentieth embodiment. A storage device 301 can store: photographing means parameters 301-2 which are parameters of photographing means constituting the information presenting apparatus; position posture information 301-1 of the photographing means at a time when the information presenting apparatus performs the information presentation; spatial orientation information 301-3 of a plurality of markers; image information characteristics 301-4 of the plurality of markers; and spatial orientation information 301-5 of the object. Photographing means 302 photographs an image including at least one marker which exists as a reference in the real world within a photographing region and whose position and posture with respect to a reference marker are known. A calculation device 303 calculates position posture information of the photographing means 302 from the photographed image including the marker photographed by the photographing means 302 and the information in the storage device 301. A display device 304 performs superimposition display of the photographed image and the information. Here, in the display device 304, there is displayed the spatial orientation information of the marker other than the reference marker among the plurality of markers. Input means 300 is used for modifying at least one piece of information of the spatial orientation information 301-3 of the marker and the image information characteristics 301-4 of the marker in the storage device 301. The calculation device 303 modifies the information in the storage device 301 based on an input of the input means 300.

Moreover, it is possible to display in the display device 304 the spatial orientation information of a non-installed marker other than the reference marker among the plurality of markers.

Furthermore, it is possible to display in the display device 304 the spatial orientation information of an installed marker other than the reference marker among the plurality of markers.

Figure 26:
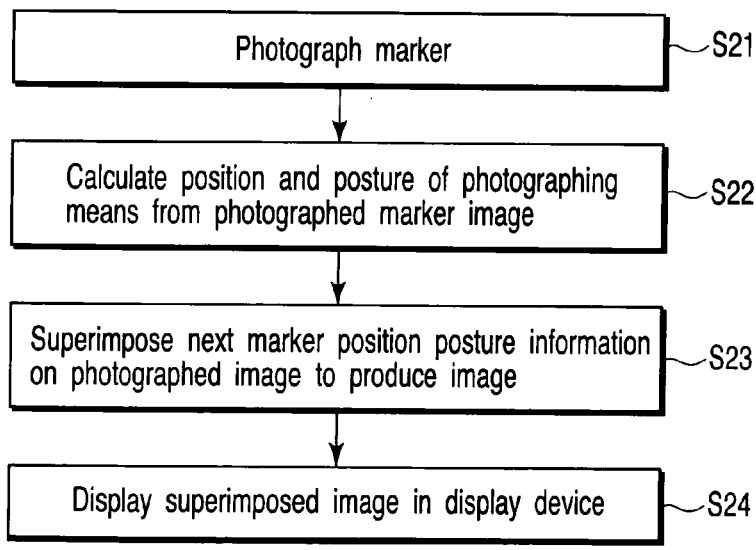
FIG. 26 is an explanatory view of a function of the information presenting apparatus according to the twentieth embodiment of the present invention.

FIG. 26 is an explanatory view of a function of the information presenting apparatus according to the twentieth embodiment of the present invention. First, the photographing means 302 photographs the marker which is a reference (step S21). Next, the calculation device 303 calculates the position and posture of the photographing means 302 from the photographed marker image (step S22). Next, the calculation device 303 produces an image obtained by superimposing the next marker position posture information on the photographed image with reference to the storage device 301 (step S23). Next, the produced superimposed image is displayed in the display device 304 (step S24).

Figure 27:
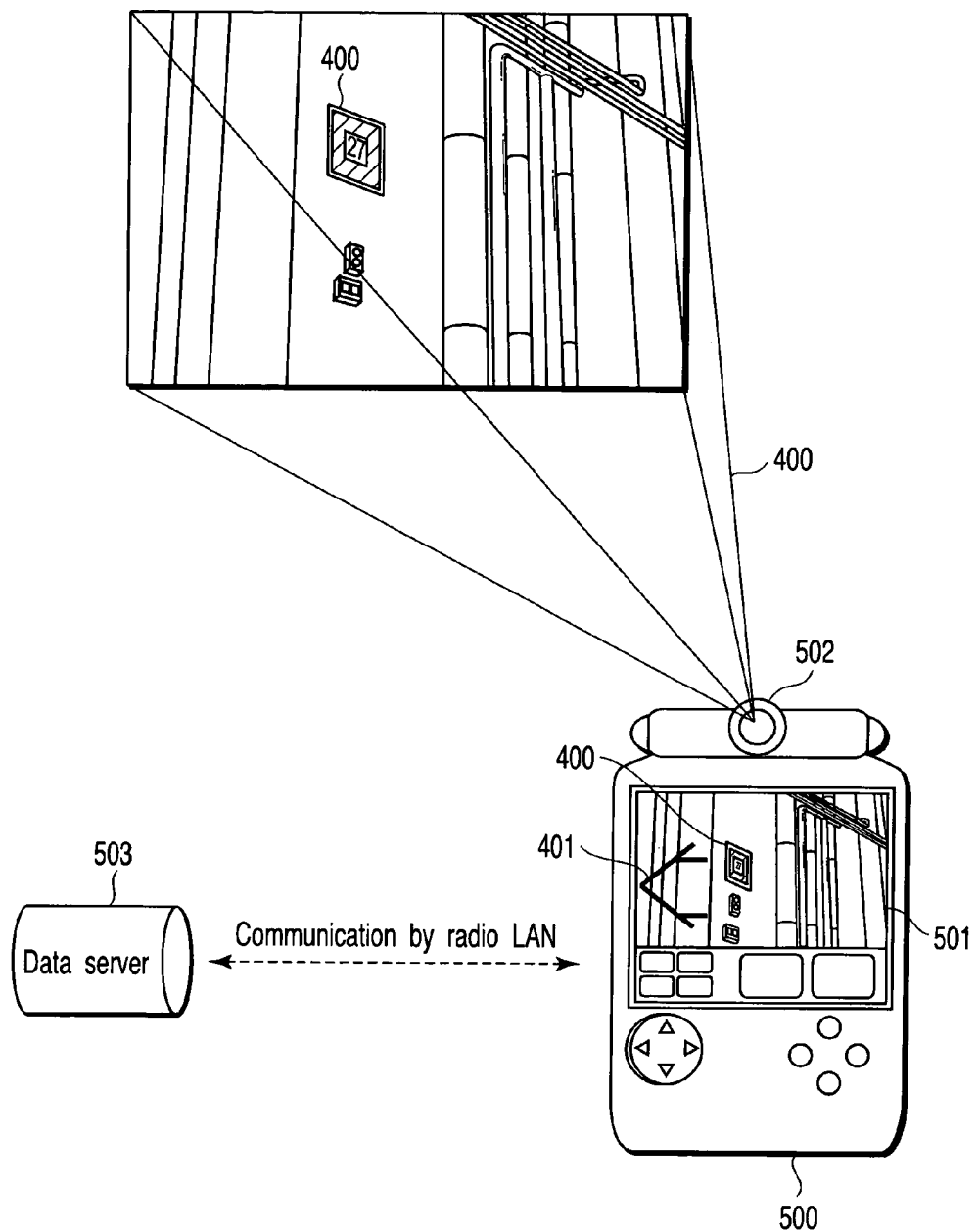
FIG. 27 is a diagram showing a behavior of a PDA having a camera in communicating with a data server via a radio LAN.

A specific application example of the above-described information presenting apparatus will be described hereinafter. FIG. 27 is a diagram showing a behavior of a PDA 500 having a camera 502 in communicating with a data server 503 via a radio LAN. When a user photographs one already installed marker with the camera 502, the PDA 500 sends a marker image acquired by the photographing to the data server 503 via the radio LAN. The data server 503 calculates the position and posture of the camera 502 from a reflected degree of the sent marker, the kind of the already stored marker, and the spatial orientation information of the marker. The server assumes the sent image as a reference marker, and superimposes the kind of another marker and the spatial orientation information of the marker on the reference marker to produce an image, and returns the image to the PDA 500. The received image is displayed in a display screen (here, the liquid crystal display) of a display device 501 of the PDA 500.

Figure 28:
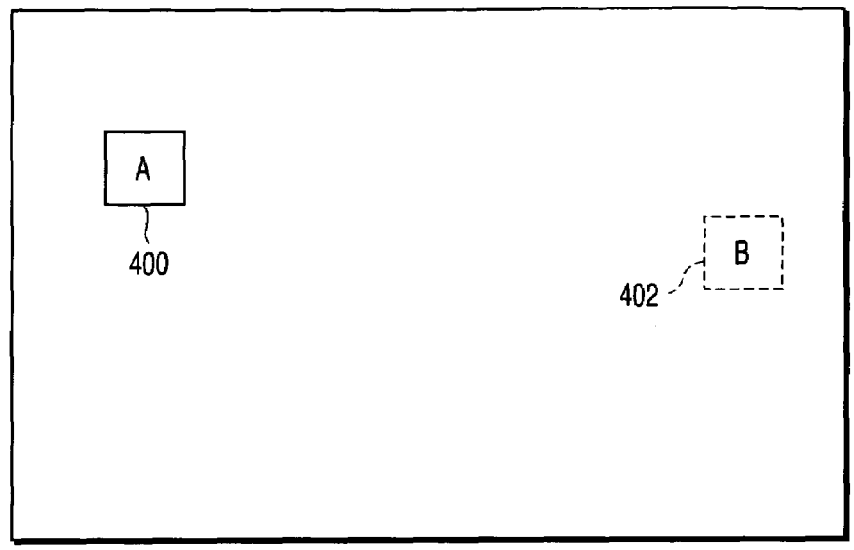
FIG. 28 is a diagram showing a reference marker and a behavior in superimposing and displaying on this reference marker a place where the next marker is to be installed.

FIG. 28 is a diagram showing a reference marker 400 and a behavior in superimposing and displaying on this reference marker 400 a place 402 where the next marker is to be installed. The user can see the kind of the marker displayed in this display screen and the spatial orientation information of the marker to install the next marker.

Figure 29:
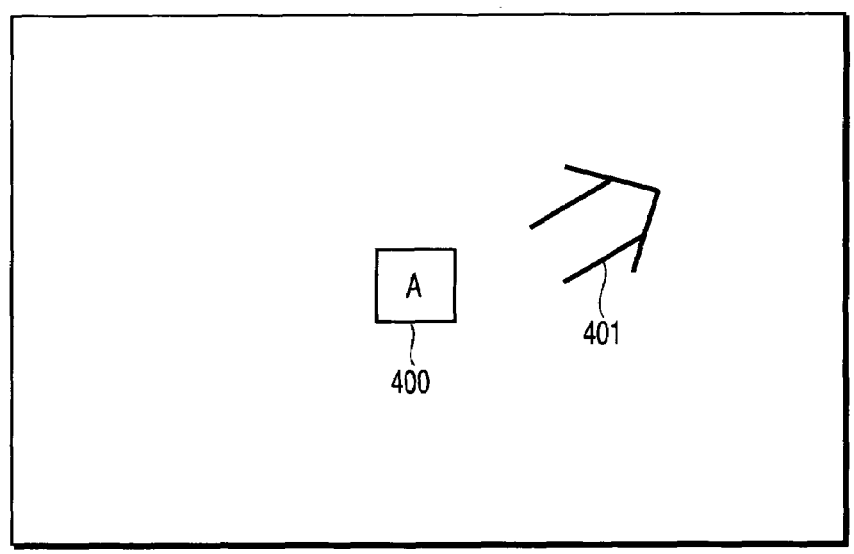
FIG. 29 is a diagram showing a behavior in superimposing and displaying on the reference marker an indication of a direction to which the camera is to be moved.
Figure 30:
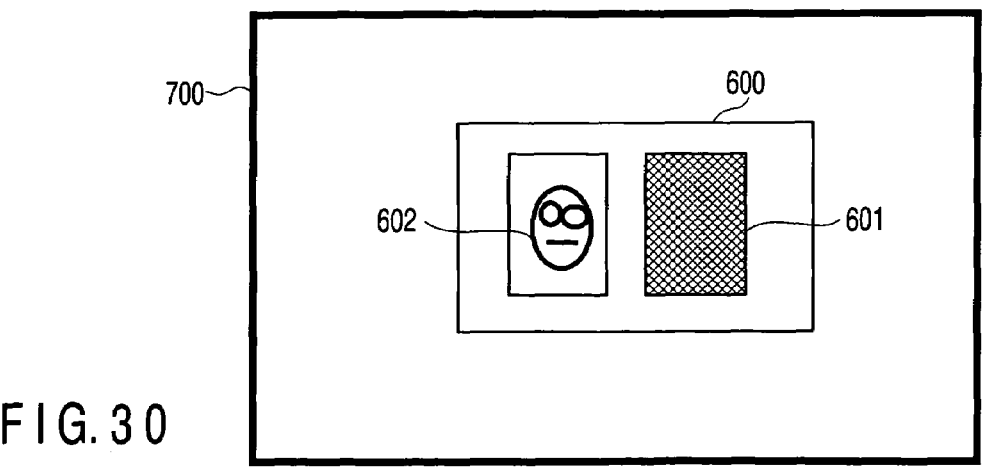
FIG. 30 is a diagram showing an output example of a conventional device which outputs relevant information by use of spatial orientation information of an object and/or a previously decided marker.

It is to be noted that in a case where the spatial orientation information of another marker is not included in a photographed image displayed in the display screen, as shown in FIG. 29, an instruction 401 is displayed concerning which direction to move the camera 502.

It is to be noted that the calculation of the position and posture of the camera and the production of the information superimposed image may be performed on either a data server 503 side or a PDA 500 side. The present embodiment is not limited to a form such as the PDA 500 or the data server 503. The PDA 500 may be connected to the data server 503 via a cable, and the PDA 500 may be a notebook PC. The data server 503 may be mounted in the PDA 500.

Furthermore, in the PDA 500, the camera 502 does not have to be combined with the display device 501 as shown in FIG. 27, and the camera 502 may be separated from the display device 501. Consequently, the camera 502 is disposed in a position in which the object can be photographed, and it is possible to perform a marker installing operation alone while moving the display device 501 to a position in which the marker is to be installed and observing the display screen.

Furthermore, when the same contents as display contents displayed in the PDA 500 are displayed in a projector or the like in an enlarged size, instructing information for marker installation can be easily seen.

According to the above-described twentieth embodiment, since the position to install the next marker is presented based on the reference marker in the marker installing operation which is a prearrangement in the information presentation, errors in the marker installation are reduced, and the number of steps of installing the marker can be remarkable reduced.

(Additional Notes)

The inventions constituted as follows can be extracted from the above-described specific embodiments.

(1) A data authoring device which sets predetermined relevant information for an information presenting apparatus to output the predetermined relevant information by use of spatial orientation information meant by an object of the real world and/or a previously decided marker, the device comprising:

a spatial orientation information input section which inputs the spatial orientation information of the object and/or the previously decided marker;

a relevant information setting section which sets a method of displaying the predetermined relevant information;

a spatial orientation information display section which displays the spatial orientation information of the object and/or the previously decided marker input by the spatial orientation information input section and which displays the predetermined relevant information in accordance with the displaying method set by the relevant information setting section; and a data output section which outputs data describing display setting of the display by the spatial orientation information display section.

(Corresponding Embodiments)

An embodiment concerning this data authoring device described in (1) corresponds to the first to sixteenth embodiments.

(Function and Effect)

A function and an effect of this data authoring device described in (1) will be described with reference to FIG. 1. As an example, it is assumed that a desired function of the information presenting apparatus (here, a PDA provided with a camera) is "it is desired that when a signboard of ○○ mart is seen with the PDA provided with the camera, a character is superimposed and displayed on a store in a PDA screen by CG, and is seen to say 'Welcome!'". The data authoring device for this will be described as an example.

First, a spatial orientation information input section 1 inputs spatial orientation information a of an object of the real world and/or a previously decided marker. Here, the spatial orientation information a corresponds to three-dimensional coordinates data of the ○○ mart and coordinates data of the signboard. Subsequently, the spatial orientation information a is displayed in a spatial orientation information display section 2. An operator of the data authoring device sets predetermined relevant information b in a relevant information setting section 3 while confirming the spatial orientation information a. Here, the predetermined relevant information corresponds to a person's 3DCG data and voice data saying "welcome". An output is set in such a manner that when the person's 3DCG data is disposed on the store, and the signboard is input into the screen of the information presenting apparatus, a person appears, and voice "welcome" is issued. Subsequently, data c describing display setting is output via a data output section 4. Here, it is assumed that the data is described in an electronic file, and this electronic file is read by the information presenting apparatus which is a utilization object. As a final result, a desired function of the information presenting apparatus (here, the PDA provided with the camera) is achieved.

In this data authoring device described in (1), to set the predetermined relevant information, the spatial orientation information a is displayed in the spatial orientation information display section 2, and an operator of the data authoring device can set the predetermined relevant information b in the relevant information setting section 3 while confirming the spatial orientation information a. Therefore, the spatial orientation information for use is not limited to a two-dimensional plane (in this example, when the signboard is seen, the person appears in such a manner as to stand on the store), and an arbitrary output can be easily set. Since the spatial orientation information a and the relevant information b can be visually simultaneously confirmed, simulation in the information presenting apparatus can be simultaneously performed. Therefore, there is an effect that an adjustment can be made in such a manner as to obtain a desired output for the operator.

(2) The data authoring device according to (1), wherein the predetermined relevant information includes an image information object, and the spatial orientation information display section displays the spatial orientation information of the image information object.

(Corresponding Embodiment)

An embodiment concerning this data authoring device described in (2) corresponds to the first to sixteenth embodiments.

(Function and Effect)

A function and an effect of this data authoring device described in (2) will be described. The relevant information b of this data authoring device described in (2) includes the image information object, and the spatial orientation information display section 2 displays the spatial orientation information of the image information object.

In a case where an image is to be presented and output in the screen, the spatial arrangement to output the image is a more important point. The way it appears largely differs with the posture. In this case, when the spatial orientation information display section 2 displays the spatial orientation information of the image information object to perform the display setting, the setting can be performed easily for the operator of the data authoring device, and it is additionally possible to make the adjustment in such a manner as to obtain a more desired output. That is, the spatial orientation information for use is not limited to the two-dimensional plane, arbitrary handling can be easily set, and it is additionally possible to make the adjustment in such a manner as to obtain the desired output for the operator of the data authoring device.

(3) The data authoring device according to (1) or (2), wherein the spatial orientation information display section displays both of the spatial orientation information of the object and that of the previously decided marker, the device further comprising a geometric characteristic setting section which arbitrarily sets geometric characteristics of at least one of the spatial orientation information of the object and that of the previously decided marker.

(Corresponding Embodiment)

An embodiment concerning this data authoring device described in (3) corresponds to the second to sixteenth embodiments.

(Function and Effect)

A function and an effect of this data authoring device described in (3) will be described. In the spatial orientation information display section 2 of this data authoring device described in (3), there are displayed both of the spatial orientation information of the object and the previously decided marker by use of a coordinates space or the like. Moreover, the device has a geometric characteristic setting section 5 which arbitrarily sets the geometric characteristics of at least one of the object and the marker (see FIG. 3).

Examples of the previously decided marker include a two-dimensional code which distinguishes kinds of articles, and a square marker capable of obtaining a position/direction of a viewing camera by calculation and the like (see FIG. 4). In this data authoring device described in (3), both of the spatial orientation information of the object and such marker are displayed in the spatial orientation information display section 2. It is considered that the marker printed on, for example, paper or plastic is pasted on the object, but when a place to paste the marker in actual is excessively conspicuous, it is unfavorable in respect of scenery, but when the image cannot be input, there is no point in using the information presenting apparatus. Therefore, when both of the information are set while being displayed in the spatial orientation information display section 2 as in this data authoring device described in (3), it is possible to set the information easily on more appropriate conditions. This data authoring device described in (3) has the geometric characteristic setting section 5 which arbitrarily sets the geometric characteristics of at least one of the spatial orientation information of the object and the marker. When the geometric characteristic setting section 5 sets, for example, a marker size, shape or the like, it is possible to set the characteristics on more appropriate conditions (e.g., conditions that the marker is easily recognized without impairing the scenery).

(4) The data authoring device according to (2), wherein the spatial orientation information display section displays both of the spatial orientation information of the previously decided marker and that of the image information object, the device further comprising a geometric characteristic setting section which arbitrarily sets geometric characteristics of at least one of the spatial orientation information of the previously decided marker and that of the image information object.

(Corresponding Embodiment)

An embodiment concerning this data authoring device described in (4) corresponds to the third to sixteenth embodiments.

(Function and Effect)

A function and an effect of this data authoring device described in (4) will be described. In the spatial orientation information display section 2 of this data authoring device described in (4), there are displayed both of the spatial orientation information of the previously decided marker and the image information object. Moreover, the device has the geometric characteristic setting section 5 which arbitrarily sets the geometric characteristics of at least one of the spatial orientation information of the previously decided marker and the image information object.

In the information presenting apparatus, it is considered that a certain image information object is to be allowed to appear in an appropriate position with respect to the marker. For example, there is a case where when the information presenting apparatus inputs the image of the marker, a rightward arrow is superimposed and displayed in front of the marker.

In this case, it is necessary to set a position in front of the marker and a posture for allowing the object to appear, so that the object is easily seen for an end user who uses the information presenting apparatus.

Therefore, when both of the information are set while being displayed in the spatial orientation information display section 2 as in this data authoring device described in (4), it is possible to set an arrangement relation between the both easily according to more appropriate conditions. This data authoring device described in (4) has the geometric characteristic setting section 5 which arbitrarily sets the geometric characteristics of at least one of the spatial orientation information of the object and the marker. For example, when the geometric characteristic setting section 5 sets the size or the shape of the marker, it is possible to dispose the marker on conditions that the marker can be easily recognized without impairing scenery. When the size, the shape or the like of the image information object is set, the image information object (here, rightward arrow) can be set in such a manner that the object is easily seen by the end user who uses the information presenting apparatus, for example, the arrow is prevented from being excessively large and being protruded from the screen. The shape of the object is changed in such a manner that its direction is easily seen, or a three-dimensional arrow is set.

(5) The data authoring device according to (2), wherein the spatial orientation information display section displays the spatial orientation information of the object, that of the previously decided marker, and that of the image information object, the device further comprising a geometric characteristic setting section which arbitrarily sets geometric characteristics of at least one of the spatial orientation information of the object, that of the previously decided marker, and that of the image information object.

(Corresponding Embodiment)

An embodiment concerning this data authoring device described in (5) corresponds to the fourth to sixteenth embodiments.

(Function and Effect)

A function and an effect of this data authoring device described in (5) will be described. In the spatial orientation information display section 2 of this data authoring device described in (5), the spatial orientation information on the object, the previously decided marker, and the image information object is displayed. Moreover, the device has the geometric characteristic setting section 5 which arbitrarily sets the geometric characteristics of at least one of the above three spatial orientation information.

In the information presenting apparatus, there is considered a case where the marker is pasted on an appropriate position with respect to the object, and a certain image information object is allowed to appear in an appropriate position with respect to the marker. For example, when the image of the marker pasted on the wall is input into the information presenting apparatus, a 3DCG character is to be seen to emerge in a position little distant from the wall.

In this case, an arrangement relation among the "wall", "marker", and "character" has to be set in consideration of various points such as "a position of the wall where the marker can be pasted", "where to place the marker so that the end user who uses the information presenting apparatus easily sees it", "position and posture to allow the character to appear, which raise directing effects", and "whether the whole character is seen while confirming the marker".

To solve the problem, when the spatial orientation information of the three are set while being three-dimensionally displayed in the spatial orientation information display section 2 as in this data authoring device described in (5), it is possible to set the positional relation among the three easily on more appropriate conditions while visually confirming the above-described points.

Moreover, this data authoring device described in (5) has the geometric characteristic setting section 5 which arbitrarily sets the geometric characteristics of at least one of the object, the marker, and the image information object. For example, when the size, the shape or the like of the marker is appropriately set, the marker can be disposed on the conditions that the marker is also easily recognized without impairing the scenery. When a size, a direction or the like of the image information object is appropriately set, the object is easily seen by the end user who uses the information presenting apparatus, for example, the character is prevented from being excessively large or protruding from the screen, or the posture can be set in such a manner that the character's face is easily seen. As the spatial orientation information of the object, a part of a shielding portion is removed, the size of the marker is changed and set in such a manner that the marker is easily recognized, and an actual object is worked and modified in accordance with the changed setting. Consequently, there is an effect that a recognition performance of the marker is improved at an actual use time of the information presenting apparatus.

As a result, all of the above-described functions have an effect in improving the performance in such a manner as to obtain the desired output in a case where an information processing device is operated.

(6) The data authoring device according to any one of (3) to (5), wherein the geometric characteristics have at least one of a spatial size, rotation, and a shape.

(Corresponding Embodiment)

An embodiment concerning this data authoring device described in (6) corresponds to the fifth and sixteenth embodiments.

(Function and Effect)

A function and an effect of this data authoring device described in (6) will be described. In this data authoring device described in (6), the geometric characteristics have at least one of the spatial size, the rotation, and the shape, and it is possible to adjust the geometric characteristics of the object, the marker, and the image information object.

As to the effect, when size change, rotation conversion, and shape conversion of the marker are performed in conformity to a marker recognition performance or use environment of the information presenting apparatus, the adjustment can be made in such a manner as to obtain a more desired output. When the size change, rotation conversion, and shape conversion of the image information object are performed, there is an effect in setting an image appearing in the information presenting apparatus to be easy to see, or displaying in a screen portion (e.g., character face, etc.) to be seen more easily. When the size change, rotation conversion, and shape conversion of the object are performed, an actual object is changed/worked in an actual utilization scene, the marker is set to be easier to see, and directing effects can be raised.

(7) The data authoring device according to any one of (3) to (5), wherein the geometric characteristic setting section has an optimizing section which appropriately sets the geometric characteristics.

(Corresponding Embodiment)

An embodiment concerning this data authoring device described in (7) corresponds to the sixth to sixteenth embodiments.

(Function and Effect)

A function and an effect of this data authoring device described in (7) will be described. This data authoring device described in (7) has an optimizing section 6 for appropriately setting the geometric characteristics in the geometric characteristic setting section 5, and it is possible to set optimum conditions in adjusting the geometric characteristics of the object, the marker, and the image information object (see FIG. 9). To set the optimum conditions, for example, there may be provided a function of: adjusting the size of the marker or the image information object in accordance with the field angle of the camera of the image input section of the information presenting apparatus; presenting candidates of a position to place the marker in accordance with a visual field; or automatically pasting the marker on the object. It is to be noted that optimization used herein does not mean that one optimum solution is obtained, and indicates a broad meaning that several better conditions are suggested or several solutions are automatically obtained for improvement of a performance.

Since it is possible to set the geometric characteristics on the optimum conditions by the function of the optimizing section 6 in this manner, there is an effect that the desired output can be set in the information presenting apparatus more easily for the operator of the data authoring device.

(8) The data authoring device according to (7), wherein the optimizing section has a function of automatically disposing the marker and the object in such a manner that at least the surface of the marker spatially comes into contact with that of the object.

(Corresponding Embodiment)

An embodiment concerning this data authoring device described in (8) corresponds to the sixth to sixteenth embodiments.

(Function and Effect)

A function and an effect of this data authoring device described in (8) will be described. In this data authoring device described in (8), the optimizing section 6 has a function of automatically disposing the marker in such a manner that the surface of the marker spatially comes into contact with that of the object. It is often considered that when the information presenting apparatus is actually used, the marker is pasted on an actual object. In this data authoring device described in (8), when a portion of the object to be pasted is designated in displaying the marker and the object in the spatial orientation information display section 2, the marker is automatically disposed in such a manner as to come into contact with the surface to be pasted. Specifically, when the object surface is a wall, the marker may be disposed in such a manner that a normal vector from a point designated by the operator of the data authoring device agrees with that of the marker surface. In the spatial orientation information display section 2, it is considered that the display is performed by, for example, a three-surface view or a perspective view, but when the operator who is not accustomed to such view pastes the marker on the surface, there is a possibility that the marker subtly tilts or detaches. Even for the operator who is accustomed to the view, when the number of the markers increases, troubles increase, and the pasting is laborious. If the marker is pasted on the surface with a simple designating operation as in this data authoring device described in (8), any operator can easily set the display regardless of experience, even when the number of the markers increases.

(9) The data authoring device according to (7), wherein the optimizing section automatically sets a spatial region of the marker based on at least one of characteristics and use environment of the information presenting apparatus and the spatial orientation information of the image information object.

(Corresponding Embodiment)

An embodiment concerning this data authoring device described in (9) corresponds to the seventh to sixteenth embodiments.

(Function and Effect)

A function and an effect of this data authoring device described in (9) will be described. In this data authoring device described in (9), the optimizing section 6 has a function of automatically setting the spatial region of the marker based on at least one of the characteristics and the use environments of the information presenting apparatus and the spatial orientation information of the image information object.

In a case where the marker is pasted on the actual object in order to actually use the information presenting apparatus, it is an important point which influences the performance of the information presenting apparatus to consider "where to paste the marker so that it is easily seen by the end user who uses the information presenting apparatus", "where to paste the marker so that it is easily recognized without being influenced by outside light", "where to paste the marker so that the character is allowed to appear in a designated place" and the like.

This data authoring device described in (9) automatically sets the spatial region of the marker based on at least one of the characteristics and the use environment of the information presenting apparatus and the spatial orientation information of the image information object. Specifically, for example, when a spatial position in which the image information object should appear is set during the displaying in the spatial orientation information display section 2, the region of the marker to be installed is displayed from field angle data of the camera of the information presenting apparatus and data of an assumed camera position. The operator of the data authoring device may install the marker in an appropriate position in the region. The spatial orientation information display section 2 may display a region which is little influenced by external lettering or on which the marker must not be or may be physically pasted.

When the region in which the marker should be installed is automatically set as in this data authoring device described in (9), the marker can be set merely by an operation of pasting the marker on the region by the operator of the data authoring device. Therefore, the display can be set more easily, and a confirmation test does not have to be performed using the actual information presenting apparatus every time the marker is adjusted.

(10) The data authoring device according to (7), wherein the optimizing section automatically sets a spatial region to set the image information object based on at least one of characteristics and use environment of the information presenting apparatus and the spatial orientation information of the marker.

(Corresponding Embodiment)

An embodiment concerning this data authoring device described in (10) corresponds to the eighth to sixteenth embodiments.

(Function and Effect)

A function and an effect of this data authoring device described in (10) will be described. In this data authoring device described in (10), the optimizing section 6 has a function of automatically setting the spatial region of the image information object based on at least one of the characteristics and the use environment of the information presenting apparatus and the spatial orientation information of the marker.

In a case where the image information object is allowed to appear when actually using the information presenting apparatus, it is an important point which influences the performance of the information presenting apparatus to consider "which position to set the character so that a character image is allowed to appear while a marker to be actually pasted is taken by the camera", "the character is to be allowed to appear in such a manner that it does not spatially overlap with an actual column", "the character is to be allowed to appear in such a manner as to come into spatial contact with an actual ground", "the character is allowed to appear in such a manner as to cover the marker, so that the marker becomes inconspicuous in the screen of the information presenting apparatus" and the like.

This data authoring device described in (10) automatically sets the spatial region of the image information object based on at least one of the characteristics and the use environment of the information presenting apparatus and the spatial orientation information of the marker. Specifically, for example, when the spatial position in which the marker should be pasted is set during the displaying in the spatial orientation information display section 2, the installation region of the image information object that should appear is displayed from a field angle region and the assumed camera position of the camera of the information presenting apparatus. The operator of the data authoring device may set the image information object in the appropriate position in the region. In the spatial orientation information display section 2, there may be displayed a region which satisfies conditions in a case where the image information object is allowed to appear on desired conditions that the object comes into contact with or does not overlap with the actual object.

When the region in which the image information object should be installed is automatically set as in this data authoring device described in (10), the image information object can be set merely by the operation of pasting the object on the region by the operator. Therefore, the display can be set more easily, and the confirmation test does not have to be performed using the actual information presenting apparatus every time the image information object is adjusted.

(11) The data authoring device according to (7), wherein the optimizing section sets positions of the marker and the image information object with respect to the object while keeping relative positions of them to be constant.

(Corresponding Embodiment)

An embodiment concerning this data authoring device described in (11) corresponds to the ninth to sixteenth embodiments.

(Function and Effect)

A function and an effect of this data authoring device described in (11) will be described. In this data authoring device described in (11), the optimizing section 6 sets the positions with respect to the object while keeping the relative positions of the marker and the image information object to be constant.

When the information presenting apparatus is actually used, the marker and the image information object are treated as a pair of concepts in many cases. For example, in a case where when the information presenting apparatus inputs the image of the marker, a direction indicating arrow appears in the screen, as shown in FIG. 13, and a marker sign and the appearing arrow are easier to see when set by the pair of concepts. In this case, specifically, for example, when the positions with respect to the object can be set while keeping the relative positions of the marker and the image information object to be constant during the displaying in the spatial orientation information display section 2, it is possible to set both of the positions of the marker and the image information object simultaneously without successively setting them.

When the positions with respect to the object are set while keeping the relative positions of the marker and the image information object to be constant in this manner, both of the positions can be simultaneously set merely by setting of the positions of the pair for the operator of the data authoring device. Therefore, it is possible to set the display more easily.

(12) The data authoring device according to any one of (1) to (11), further comprising a demonstration output section which demonstrates beforehand the information presented by the information presenting apparatus.

(Corresponding Embodiment)

An embodiment concerning this data authoring device described in (12) corresponds to the tenth to sixteenth embodiments.

(Function and Effect)

A function and an effect of this data authoring device described in (12) will be described. This data authoring device described in (12) has a demonstration output section 7 capable of demonstrating beforehand the information output by the information presenting apparatus (see FIG. 14). When various types of information are output in the spatial orientation information display section 2, the output from the information presenting apparatus can be confirmed to a certain degree. However, in a case where outputs are ordered and are to be seen in this order, or a case where one desires to confirm the outputs while virtually walking through a path of the real world, the demonstration output section 7 is separately disposed to perform demonstration as in this data authoring device described in (12), and it is then possible to experience an output closer to that of the actual information presenting apparatus. The purpose of the spatial orientation information display section 2 is limited to facilitation of setting of the output. Concerning the object, the marker, and the image object, only spatial orientation information having a comparatively light data amount is output, and detailed texture information having a large data amount is set without being displayed. Accordingly, calculation can be speeded up. In this case, in the demonstration output section 7, the texture information may be displayed to perform a final check.

(13) The data authoring device according to (2), further comprising an image information characteristic setting section which arbitrarily sets image information characteristics of the image information object or the previously decided marker.

(Corresponding Embodiment)

An embodiment concerning this data authoring device described in (13) corresponds to the eleventh to sixteenth embodiments.

(Function and Effect)

A function and an effect of this data authoring device described in (13) will be described. This data authoring device described in (13) has an image information characteristic setting section 8 which arbitrarily sets the image information characteristics of the image information object or the previously decided marker (see FIG. 15). Concerning the image information object or the previously decided marker, in addition to the geometric characteristics, various types of image information can be set such as image color, luminance, and letter type. Accordingly, it is possible to set "it is desired that the image information object be conspicuous in contrast to background", "it is desired that the marker be of an inconspicuous color in contrast to the background" and the like. Therefore, it is possible to improve a performance of an actual information presenting apparatus.

(14) The data authoring device according to (13), wherein the image information characteristics include at least one of a color, a brightness, an image size, chromatic monochromatic information, a format type, and a letter font of the image.

(Corresponding Embodiment)

An embodiment concerning this data authoring device described in (14) corresponds to the eleventh to sixteenth embodiments.

(Function and Effect)

A function and an effect of this data authoring device described in (14) will be described. In this data authoring device described in (14), the image information characteristics have at least one of the image color, brightness, image size, chromatic and monochromatic information, format form, and letter font. These characteristics are comparatively easily changed, and the change can be instantly seen. Therefore, when various types of image information are set, it is possible to easily set "it is desired that the image information object be conspicuous in contrast to the background", "it is desired that the marker be of the inconspicuous color in contrast to the background" and the like. Therefore, it is possible to improve the performance of the actual information presenting apparatus.

(15) The data authoring device according to (2), wherein the image information object utilizes a three-dimensional coordinates.

(Corresponding Embodiment)

An embodiment concerning this data authoring device described in (15) corresponds to the twelfth to sixteenth embodiments.

(Function and Effect)

A function and an effect of this data authoring device described in (15) will be described. In this data authoring device described in (15), the image information object is the image having the concept of the three-dimensional coordinates. In a case where the image information object is output, a spatial arrangement to output the object is a more important point, but especially in a case where the image has the three-dimensional coordinates, the way it appears largely differs with the arrangement or a posture. In this case, when spatial orientation information of the image information object is displayed in the spatial orientation information display section 2 to perform the display setting, the setting is performed easily by the operator of the data authoring device, and it is additionally possible to make an adjustment in such a manner as to obtain more desired outputs. That is, the spatial orientation information for use is not limited to a two-dimensional plane, arbitrary handling can be easily set, and it is possible for the operator to make the adjustment in such a manner as to obtain the desired output.

(16) The data authoring device according to (2), wherein the image information object has letter information.

(Corresponding Embodiment)

An embodiment concerning this data authoring device described in (16) corresponds to the thirteenth to sixteenth embodiments.

(Function and Effect)

A function and an effect of this data authoring device described in (16) will be described. In this data authoring device described in (16), the image information object has letter information. The image information object described above may be a letter in addition to a general landscape image photographed by the camera, a prepared picture and the like. In the information presenting apparatus, the letter may be three-dimensionally prepared in a three-dimensional CG, allowed to emerge in a space, and displayed, or a plane of a certain size including the letter information may be allowed to emerge in the space and displayed (virtual signboard, etc.). In any case, the display is set in such a manner as to obtain the desired output during the displaying in the spatial orientation information display section 2 of this data authoring device described in (16). It is to be noted that in a case where the letter information (may include image information) is to be displayed over the whole screen of the information presenting apparatus, the spatial orientation information does not have to be considered. Therefore, "whole screen display" may be set in the relevant information setting section 3 without displaying any information in the spatial orientation information display section 2.

(17) The data authoring device according to (1), which sets at least two of the predetermined relevant information with respect to the same object of the real world and/or the same previously decided marker.

(Corresponding Embodiment)

An embodiment concerning this data authoring device described in (17) corresponds to the fourteenth to sixteenth embodiments.

(Function and Effect)

A function and an effect of this data authoring device described in (17) will be described. As an example of utilizing the information presenting apparatus, for example, even if looking at the same marker, the setting is to be sometimes made depending on time in such a manner that a rightward arrow appears in the morning, and a leftward arrow appears in the evening. There is also a case where a gender of the end user who utilizes the information presenting apparatus is registered beforehand in the information presenting apparatus, and an arrow to a bathroom is to be changed according to the gender. There is also a case where when a certain marker is seen, different CGs successively switch.

In this data authoring device described in (17), at least two of the predetermined relevant pieces of information can be set with respect to the same object of the real world, or the same previously decided marker. In this manner, the above-described cases are handled, and the performance of the information presenting apparatus can be improved.

(18) The data authoring device according to (17), wherein the at least two existing predetermined relevant information are the same type of outputs having different data capacities.

(Corresponding Embodiment)

An embodiment concerning this data authoring device described in (18) corresponds to the fifteenth and sixteenth embodiments.

(Function and Effect)

A function and an effect of this data authoring device described in (18) will be described. There is considered a case where a PC version, a PDA version, and a cellular phone version which realize similar functions are all prepared as objects of the information presenting apparatus in accordance with applications. In this case, it is laborious to perform data authoring for each apparatus. However, performances differ with the respective apparatuses, and especially memory capacities and graphic processing performances have large differences. Therefore, even the same type of predetermined relevant information has to be prepared with changed capacities. For example, a polygon number in 3DCG is changed, or a texture capacity is converted. However, it is laborious to perform the data authoring anew for each apparatus. Therefore, when the plurality of the same type of outputs having different data capacities can be set as a predetermined association as in this data authoring device described in (18), it is possible to perform the authoring only once and handle the respective apparatuses.

(19) The data authoring device according to (1), further comprising an output attribute information setting section which sets output attribute information related to the relevant information with respect to the predetermined relevant information.

(Corresponding Embodiment)

An embodiment concerning this data authoring device described in (19) corresponds to the sixteenth embodiment.

(Function and Effect)

A function and an effect of this data authoring device described in (19) will be described. As a case where the information presenting apparatus is used, there is sometimes a case where the relevant information is to be selected or adjusted in accordance with certain attribute information. Examples of the information include a timing (immediately or a certain time after the marker is seen) to output the information, a magnitude of voice and the like. This data authoring device described in (19) has an output attribute information setting section 9 capable of the above-described output attribute information (see FIG. 16). Therefore, the adjustment can be made in such a manner that more desired relevant information can be output.

(20) The data authoring device according to (19), wherein the output attribute information comprises at least one of a timing to output the information, a magnitude of voice to be output, a brightness of an image to be output, a resolution of the image to be output, a data amount of the image to be output, and information defined by characteristics or use environments of the information presenting apparatus.

(Corresponding Embodiment)

An embodiment concerning this data authoring device described in (20) corresponds to the sixteenth embodiment.

(Function and Effect)

A function and an effect of this data authoring device described in (20) will be described. The output attribute information of this data authoring device described in (20) is at least one of the timing to output the information, the magnitude of voice to be output, brightness of an image to be output, a resolution of the image to be output, a data amount of the image to be output, and information defined by the characteristics or the use environment of the information relevant information device, and the respective information can be set by the output attribute information setting section 9.

The respective information can be adjusted in such a manner that the desired relevant information can be output by the setting of the attribute information such as: the timing (immediately or the certain time after the marker is seen) to output the information; the magnitude (whether or not to output a large sound volume) of the voice; the brightness (brightened in outdoor utilization) of the image to be output; the resolution (changed with an apparatus performance of the information presenting apparatus) of the image to be output; the data amount (changed with the kind of object) of the image to be output; and the information (hue is changed with the kind of the screen of the information presenting apparatus) defined by the characteristics or the use environment of the information presenting apparatus.

(21) The data authoring device according to any one of (1) to (20), wherein the spatial orientation information input section extracts the spatial orientation information from three-dimensional design information of the object and/or the previously decided marker.

(Corresponding Embodiment)

An embodiment concerning this data authoring device described in (21) corresponds to the seventeenth and eighteenth embodiments.

(Function and Effect)

A function and an effect of this data authoring device described in (21) will be described. In this data authoring device described in (21), since the spatial orientation information input section 1 extracts the spatial orientation information a (e.g., three-dimensional coordinates data of ○○ mart) of the object and/or the spatial orientation information a (e.g., coordinates data of the signboard) of the previously decided marker from the three-dimensional design information, the spatial orientation information can be easily input.

(22) The data authoring device according to (21)), wherein the spatial orientation information input section extracts the spatial orientation information from shape information and/or attribute information of the three-dimensional design information of the object and/or the previously decided marker.

(Corresponding Embodiment)

An embodiment concerning this data authoring device described in (22) corresponds to the seventeenth and eighteenth embodiments.

(Function and Effect)

A function and an effect of this data authoring device described in (22) will be described. When the three-dimensional design information of the object is designed, the marker to be disposed on the object is simultaneously designed. For example, a component name is set to the "marker", and the spatial orientation information input section 1 of the data authoring device described in (22) reads the three-dimensional design information of the object and the marker. Moreover, the section extracts information having the component name "marker" from the three-dimensional design information, and extracts the spatial orientation information from the shape information and/or the attribute information of the three-dimensional design information.

Therefore, the user does not have to set the marker separately by trial and error. Since arrangement information of the marker with respect to the object can be acquired in detail from the three-dimensional design information, the user can refer to the information when disposing the marker in the real space.

(23) The data authoring device according to any one of (1) to (22), wherein the relevant information setting section extracts the relevant information from the three-dimensional design information of the object and/or the previously decided marker.

(Corresponding Embodiment)

An embodiment concerning this data authoring device described in (23) corresponds to the seventeenth and eighteenth embodiments.

(Function and Effect)

A function and an effect of this data authoring device described in (23) will be described. In this data authoring device described in (23), since the relevant information setting section 3 reads the three-dimensional design information of the object and/or the previously decided marker, and extracts the predetermined relevant information b such as a shape or a name of the object and/or the previously decided marker, the predetermined relevant information can be easily input.

(24) The data authoring device according to (23), wherein the relevant information setting section extracts the relevant information from shape information and/or attribute information of the three-dimensional design information of the object and/or the previously decided marker.

(Corresponding Embodiment)

An embodiment concerning this data authoring device described in (24) corresponds to the seventeenth and eighteenth embodiments.

(Function and Effect)

A function and an effect of this data authoring device described in (24) will be described. When the three-dimensional design information of the object is designed, the marker to be disposed on the object is simultaneously designed, for example, a component name is set to the "marker", and the relevant information setting section 3 of the data authoring device described in (24) reads the three-dimensional design information of the object and the marker. Moreover, the section extracts information having the component name "marker" from the three-dimensional design information, and extracts the relevant information from the shape information and/or the attribute information of the three-dimensional design information. Therefore, the predetermined relevant information can be easily input.

(25) The data authoring device according to any one of (21) to (24), wherein the three-dimensional design information of the object and/or the previously decided marker is design information prepared by a three-dimensional CAD.

(Corresponding Embodiment)

An embodiment concerning this data authoring device described in (25) corresponds to the seventeenth and eighteenth embodiments.

(Function and Effect)

A function and an effect of this data authoring device described in (25) will be described. In this data authoring device described in (25), since the three-dimensional design information already designed by the three-dimensional CAD is utilized for the design of the object or the previously decided marker, the three-dimensional design information does not have to be separately prepared in order to extract the spatial orientation information.

(26) The data authoring device according to any one of (21) to (24), wherein the three-dimensional design information of the object and/or the previously decided marker is information obtained by three-dimensionally converting two-dimensional design information prepared by a two-dimensional CAD.

(Corresponding Embodiment)

An embodiment concerning this data authoring device described in (26) corresponds to the seventeenth and eighteenth embodiments.

(Function and Effect)

A function and an effect of this data authoring device described in (26) will be described. In this data authoring device described in (26), it is possible to utilize even the three-dimensional design information obtained by three-dimensionally converting the two-dimensional design information prepared by the two-dimensional CAD.

(27) The data authoring device according to (7), wherein the optimizing section calculates a value of at least one remaining information that has not been input in a information group or a range which can be taken by the value based on input information from the spatial orientation information input section, including at least the spatial orientation information of the object, and the section outputs the value or the range to a calculated information output section, and
the information group consists of: photographing means parameters which are the parameters of the photographing means constituting the information presenting apparatus; position posture information of the photographing means at a time when the information presenting apparatus performs information presentation; the spatial orientation information of the marker; image information characteristics of the marker; and the spatial orientation information of the object (Corresponding Embodiment)

An embodiment concerning this data authoring device described in (27) corresponds to the nineteenth embodiment.

(Function and Effect)

A function and an effect of this data authoring device described in (27) will be described. In this data authoring device described in (27), since installing information or photographing conditions of the marker or the like are presented beforehand in a marker installing operation as a prearrangement in the information presentation, the number of steps of installing the marker can be remarkably reduced.

(28) The data authoring device according to (27), wherein predetermined information input from the spatial orientation information input section are the spatial orientation information of the object, the photographing means parameters, and the image information characteristics of the marker.

(29) The data authoring device according to (27), wherein predetermined information input from the spatial orientation information input section are the spatial orientation information of the object, and the photographing means parameters.

(30) The data authoring device according to (27), wherein the photographing means parameters have two or more information including at least a field angle and a resolution of: the field angle and the resolution of the photographing means; the number of pixels required for recognizing the marker; and image distortion information.

(31) The data authoring device according to (27), wherein the position posture information of the photographing means at a time when performing the information presentation has position information and posture information at the time when performing the information presentation, and has a plurality of pieces of position information and posture information in a case where the photographing to perform the information presentation is performed in a plurality of places.

(32) The data authoring device according to (27), wherein the spatial orientation information of the marker comprises: a position and a posture of the marker to be installed; and a shape of the marker which is geometric characteristic information of the marker.

(33) The data authoring device according to (27), wherein the image information characteristics of the marker comprises texture information of the marker.

(34) The data authoring device according to (27), wherein the spatial orientation information of the object has two or more pieces of information, including at least position posture information and shape information of the object in the position posture information of the object, the shape information, a region photographed in performing information presentation, a region in which the photographing means is to exist, and a region in which the marker is to be installed.

(35) An information presenting apparatus comprising:
a storage device which stores information decided by the data authoring device according to any one of (1) to (34);
input means for selecting a reference marker from a plurality of markers in a case where the reference marker is not decided yet;
photographing means for photographing an image including at least one marker which exists in the real world in a photographing region and whose position and posture are known with respect to the reference marker;
a calculation device which calculates position posture information of the photographing means from the photographed image including the marker photographed by the photographing means and the information in the storage device; and
a display device which superimposes and displays the photographed image and the information, wherein the display device displays spatial orientation information of a non-installed marker other than the reference marker among the plurality of markers.

(36) The information presenting apparatus according to (35), wherein the display device displays the spatial orientation information of the non-installed marker other than the reference marker among the plurality of markers.

(37) The information presenting apparatus according to (35), wherein the display device displays the spatial orientation information of an installed marker other than the reference marker among the plurality of markers.

(38) The information presenting apparatus according to (35), having a function of modifying the information in the storage device based on information input into the input means in order to modify at least one piece of information of the spatial orientation information of the marker and image information characteristics of the marker.

(39) An information presenting apparatus comprising:
a storage device which stores three types of spatial orientation information of a plurality of markers, image information characteristics of the plurality of markers, and photographing means parameters;
photographing means for photographing an image including at least one marker which exists in the real world in a photographing region and whose position and posture are known with respect to a reference marker;
a calculation device which calculates position posture information of the photographing means from the photographed image including the marker photographed by the photographing means and the information in the storage device; and
a display device which superimposes and displays the photographed image and the information,
wherein the display device displays spatial orientation information of the marker other than the reference marker among the plurality of markers.

(Corresponding Embodiment)

An embodiment concerning this information presenting apparatus described in (39) corresponds to the twentieth embodiment.

(Function and Effect)

A function and an effect of this information presenting apparatus described in (39) will be described. In this information presenting apparatus described in (39), since a position in which the next marker should be installed is presented based on the reference marker in the marker installing operation as the prearrangement in the information presentation, errors in marker installation are reduced, and the number of steps of installing the marker can be remarkably reduced.

(40) The information presenting apparatus according to (39), wherein the display device displays the spatial orientation information of a non-installed marker other than the reference marker among the plurality of markers.

(41) The information presenting apparatus according to (39), wherein the display device displays the spatial orientation information of an installed marker other than the reference marker among the plurality of markers.

(42) The information presenting apparatus according to (39), further comprising input means for modifying at least one information of the spatial orientation information of the marker and the image information characteristics of the marker in the storage device, and
having a function of modifying the information in the storage device based on an input of the input means.

According to the present invention, there is provided a data authoring device which sets predetermined relevant information for an information presenting apparatus to output the predetermined relevant information by use of spatial orientation information of an object of the real world and/or a previously decided marker, wherein the spatial orientation information for use in setting the predetermined relevant information is not limited to a two-dimensional plane, arbitrary handling can be easily set, and various performances of the information presenting apparatus can be improved such as obtaining of a more desired output and disposing of the marker in a position easy to see.

What is claimed is:

1. A data authoring device which sets predetermined relevant information for an information presenting apparatus to output the predetermined relevant information by use of spatial orientation information meant by an object of the real world and/or a previously decided marker, the device comprising:
a spatial orientation information input section which inputs the spatial orientation information of the object and/or the previously decided marker;
a relevant information setting section which sets a method of displaying the predetermined relevant information;
a spatial orientation information display section which displays the spatial orientation information of the object and/or the previously decided marker input by the spatial orientation information input section and which displays the predetermined relevant information in accordance with the displaying method set by the relevant information setting section; and
a data output section which outputs data describing display setting of the display by the spatial orientation information display section.

2. The data authoring device according to claim 1, wherein the predetermined relevant information includes an image information object, and
the spatial orientation information display section displays the spatial orientation information of the image information object.

3. The data authoring device according to claim 2, wherein the spatial orientation information display section displays both of the spatial orientation information of the previously decided marker and that of the image information object,
the device further comprising a geometric characteristic setting section which arbitrarily sets geometric characteristics of at least one of the spatial orientation information of the previously decided marker and that of the image information object.

4. The data authoring device according to claim 2, wherein the spatial orientation information display section displays the spatial orientation information of the object, that of the previously decided marker, and that of the image information object,
the device further comprising a geometric characteristic setting section which arbitrarily sets geometric characteristics of at least one of the spatial orientation information of the object, that of the previously decided marker, and that of the image information object.

5. The data authoring device according to claim 2, further comprising an image information characteristic setting section which arbitrarily sets image information characteristics of the image information object or the previously decided marker.

6. The data authoring device according to claim 5, wherein the image information characteristics include at least one of a color, a brightness, an image size, chromatic monochromatic information, a format type, and a letter font of the image.

7. The data authoring device according to claim 2, wherein the image information object utilizes a three-dimensional coordinates.

8. The data authoring device according to claim 2, wherein the image information object has letter information.

9. The data authoring device according to claim 1 or 2, wherein the spatial orientation information display section displays both of the spatial orientation information of the object and that of the previously decided marker,
the device further comprising a geometric characteristic setting section which arbitrarily sets geometric characteristics of at least one of the spatial orientation information of the object and that of the previously decided marker.

10. The data authoring device according to any one of claims 3, wherein the geometric characteristics have at least one of a spatial size, rotation, and a shape.

11. The data authoring device according to any one of claims 3, wherein the geometric characteristic setting section has an optimizing section which appropriately sets the geometric characteristics.

12. The data authoring device according to claim 11, wherein the optimizing section has a function of automatically disposing the marker and the object in such a manner that at least the surface of the marker spatially comes into contact with that of the object.

13. The data authoring device according to claim 11, wherein the optimizing section automatically sets a spatial region of the marker based on at least one of characteristics and use environment of the information presenting apparatus and the spatial orientation information of the image information object.

14. The data authoring device according to claim 11, wherein the optimizing section automatically sets a spatial region to set the image information object based on at least one of characteristics and use environment of the information presenting apparatus and the spatial orientation information of the marker.

15. The data authoring device according to claim 11, wherein the optimizing section sets positions of the marker and the image information object with respect to the object while keeping relative positions of them to be constant.

16. The data authoring device according to any one of claim 1, further comprising a demonstration output section which demonstrates beforehand the information presented by the information presenting apparatus.

17. The data authoring device according to claim 1, which sets at least two of the predetermined relevant information with respect to the same object of the real world and/or the same previously decided marker.

18. The data authoring device according to claim 17, wherein the at least two existing predetermined relevant information are the same type of outputs having different data capacities.

19. The data authoring device according to claim 1, further comprising an output attribute information setting section which sets output attribute information related to the relevant information with respect to the predetermined relevant information.

20. The data authoring device according to claim 19, wherein the output attribute information comprises at least one of a timing to output the information, a magnitude of voice to be output, a brightness of an image to be output, a resolution of the image to be output, a data amount of the image to be output, and information defined by characteristics or use environments of the information presenting apparatus.

* * * * *